(12) United States Patent
Gupta et al.

(10) Patent No.: US 12,039,882 B2
(45) Date of Patent: Jul. 16, 2024

(54) IMAGES FOR THE VISUALLY IMPAIRED

(71) Applicant: Adobe Inc., San Jose, CA (US)

(72) Inventors: Subham Gupta, Roorkee (IN);
Poonam Bhalla, New Delhi (IN);
Krishna Singh, New Delhi (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 109 days.

(21) Appl. No.: 17/451,426

(22) Filed: Oct. 19, 2021

(65) Prior Publication Data

US 2023/0121539 A1   Apr. 20, 2023

(51) Int. Cl.
| | | |
|---|---|---|
| G09B 21/00 | (2006.01) | |
| G06F 3/04886 | (2022.01) | |
| G06F 18/21 | (2023.01) | |
| G06F 18/214 | (2023.01) | |
| G06F 18/24 | (2023.01) | |

(52) U.S. Cl.
CPC ....... *G09B 21/003* (2013.01); *G06F 3/04886* (2013.01); *G06F 18/214* (2023.01); *G06F 18/2163* (2023.01); *G06F 18/24* (2023.01); *G09B 21/006* (2013.01); *G09B 21/007* (2013.01)

(58) Field of Classification Search
CPC .. G09B 21/003; G09B 21/006; G09B 21/007; G06V 10/764
See application file for complete search history.

(56) References Cited

U.S. PATENT DOCUMENTS

| | | | | |
|---|---|---|---|---|
| 2005/0089824 | A1* | 4/2005 | Asakawa | G09B 21/007 434/112 |
| 2009/0179866 | A1* | 7/2009 | Agevik | G06F 3/016 345/173 |
| 2014/0111487 | A1* | 4/2014 | Wang | G06F 3/04886 345/178 |
| 2016/0139665 | A1* | 5/2016 | Lopez | G06F 3/013 345/156 |
| 2018/0181844 | A1* | 6/2018 | Barnett | G06V 20/30 |

(Continued)

OTHER PUBLICATIONS

Devlin, Jacob, et al., "BERT: pre-training of Deep Bidirectional Transformers for Language Understanding", revised May 24, 2019 <URL: https://arxiv.org/abs/1810.04805v2>.

(Continued)

*Primary Examiner* — Kang Hu
*Assistant Examiner* — Correll T French
(74) *Attorney, Agent, or Firm* — Weaver Austin Villeneuve & Sampson LLP

(57) ABSTRACT

Some implementations include methods for communicating features of images to visually impaired users. An image to be displayed on a touch sensitive screen of a computing device may include one or more objects. Each of the one or more objects may be associated with a bounding box. A contact with the image may be detected via the touch sensitive screen. The contact may be determined to be within a bounding box associated with a first object of the one or more objects. Responsive to detecting the contact to be within the bounding box associated with the first object, a caption of the first object may be caused to become audible and the touch sensitive screen may be caused to vibrate based on a vibration pattern unique to the first object.

20 Claims, 16 Drawing Sheets

(56) References Cited

U.S. PATENT DOCUMENTS

| | | |
|---|---|---|
| 2018/0189598 A1* | 7/2018 | Cheung .................. G06V 10/25 |
| 2021/0182588 A1* | 6/2021 | Yang .................... G06V 10/255 |
| 2021/0201044 A1* | 7/2021 | Herdade ................ G06T 11/20 |
| 2022/0269895 A1* | 8/2022 | Barkan .................. G06F 16/53 |
| 2023/0177854 A1* | 6/2023 | Han .................... G06V 10/454 |
| | | 382/190 |

OTHER PUBLICATIONS

Hu, Xiaowei, et al., "VIVO: Visual Vocabulary Pre-Training for Novel Object Captioning", *Proc. AAAI*, revised Mar. 4, 2021 <URL: https://arxiv.org/abs/2009.13682v2>.

Li, Xiujun, et al., "Oscar: Object-Semantics Aligned Pre-training for Vision-Language Tasks", *Proc. ECCV*, revised Jul. 26, 2020 <URL: https://arxiv.org/abs/2004.06165v5>.

Ren, Shaoqing, et al., "Faster R-CNN: Towards Real-Time Object Detection with Region Proposal Networks", 2016 <URL: https://arxiv.org/abs/1506.01497v3>.

Wang, Haoran, et al., "An Overview of Image Caption Generation Methods", *Computational Intelligence and Neuroscience*, vol. 2020, Article ID 3062706, 13 pages, 2020 <URL: https://www.hindawi.com/journals/cin/2020/3062706/>.

\* cited by examiner

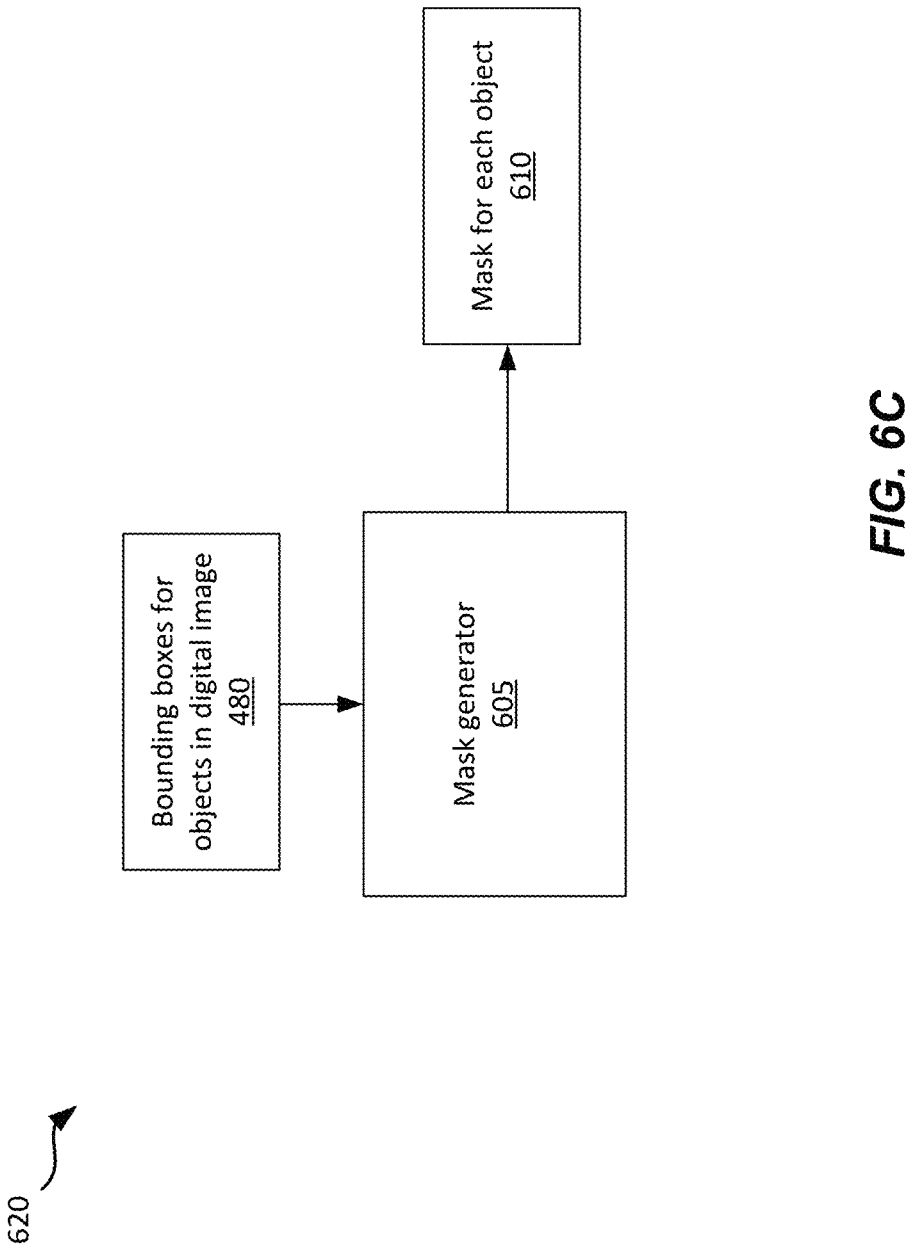

IMAGES FOR THE VISUALLY IMPAIRED

BACKGROUND

People who are visually impaired want to be able to enjoy images and photos as much as those with normal vision. They want to be able to perceive the details of the images from their own perspective rather than from the perspective of another person. They want to be able to cherish memories and feel the emotion the come with every image. They may want to be able to take photographs and record important events, to share experiences, and as an outlet for artistic expression. While there are existing techniques to help a visually impaired person to read text and navigate smart devices, there is still much to be desired when it comes to helping the visually impaired person enjoy images such as digital images displayed on smart devices.

SUMMARY OF THE INVENTION

Techniques for communicating features of digital images to visually impaired users are described herein. In some implementations, a digital image may be presented to a visually impaired user via a touch sensitive screen. The digital image may include one or more objects. Each of the one or more objects included in the digital image may be associated with a bounding box. When the visually impaired user initiates a contact with the digital image by touching the touch sensitive screen, a caption of the digital image may be audible. The caption of the digital image may be generated using a machine learning model that has been trained using paired image-word training data. When the visually impaired user initiates a contact with an object in the digital image, a caption of the object may be audible. The caption of the object may be generated based on object tags associated with the objects and using a machine learning model that has been trained using text-image pairs as training data. In some implementations, when the visually impaired user initiates a contact with an object in the digital image, a vibration pattern unique to the object may be used to cause the touch sensitive screen to vibrate.

In some implementations, a digital image to be presented to a visually impaired user via a touch sensitive screen may be evaluated to identify objects included in the digital image. Each of the identified objects may be associated with a bounding box. A mask may be generated for each of the objects in the bounding boxes. When a visually impaired user initiates a contact with the digital image by touching the touch sensitive screen, a determination may be performed to verify whether the contact touches the object in the bounding box. The determination may be performed using the mask associated with the object. Based on confirming that the object is touched, a caption of the object may be audible, and a vibration pattern unique to the object may be used to cause the touch sensitive screen to vibrate.

In some implementations, an image capturing device may be configured to display a digital image on a touch sensitive screen of the image capturing device. The digital image may be captured by a visually impaired user using the image capturing device. A caption of the digital image may be audible when the digital image is displayed on the touch sensitive screen. The caption of the image may be generated automatically based the content of the digital image. Based on the visually impaired user interacting with the digital image by touching a first object included in the digital image, a caption of the first object may be audible. Based on the visually impaired user transitioning from touching the first object to touching a second object, the placement of the second object relative to the first object in the digital image may be perceived by the visually impaired when a caption of the second object becomes audible.

In some implementations, a digital image may be represented as a set of region features. Each of the region features may be associated with an object tag. There may be multiple object tags. Each of the object tags may be assigned a weight value based on a position of the object tag relative to an area of a touch on a touch sensitive screen where the digital image is displayed. An object tag positioned near the area of the touch may be assigned a higher weight value than an object tag positioned further away from the area of the touch. A caption for an object close to the area of the touch may be generated based on the weight values of the object tags. In some implementations, a weight value may be assigned to an object tag based on whether the object is positioned within a bounding box of an object. An object tag that is positioned within a bounding box may be assigned a higher weight value than an object tag that is positioned outside of the bounding box. A caption of the object in the bounding box may be generated based on the weight values of the object tags. In some implementations, a generic value of an object tag may be replaced by a non-generic value based on determining that the object tag is associated with an object that matches with known data. The non-generic value may then be used to generate a caption for the object.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

FIG. 6C shows an example of object mask generator, in accordance with some implementations.

DETAILED DESCRIPTION

Figure 1:
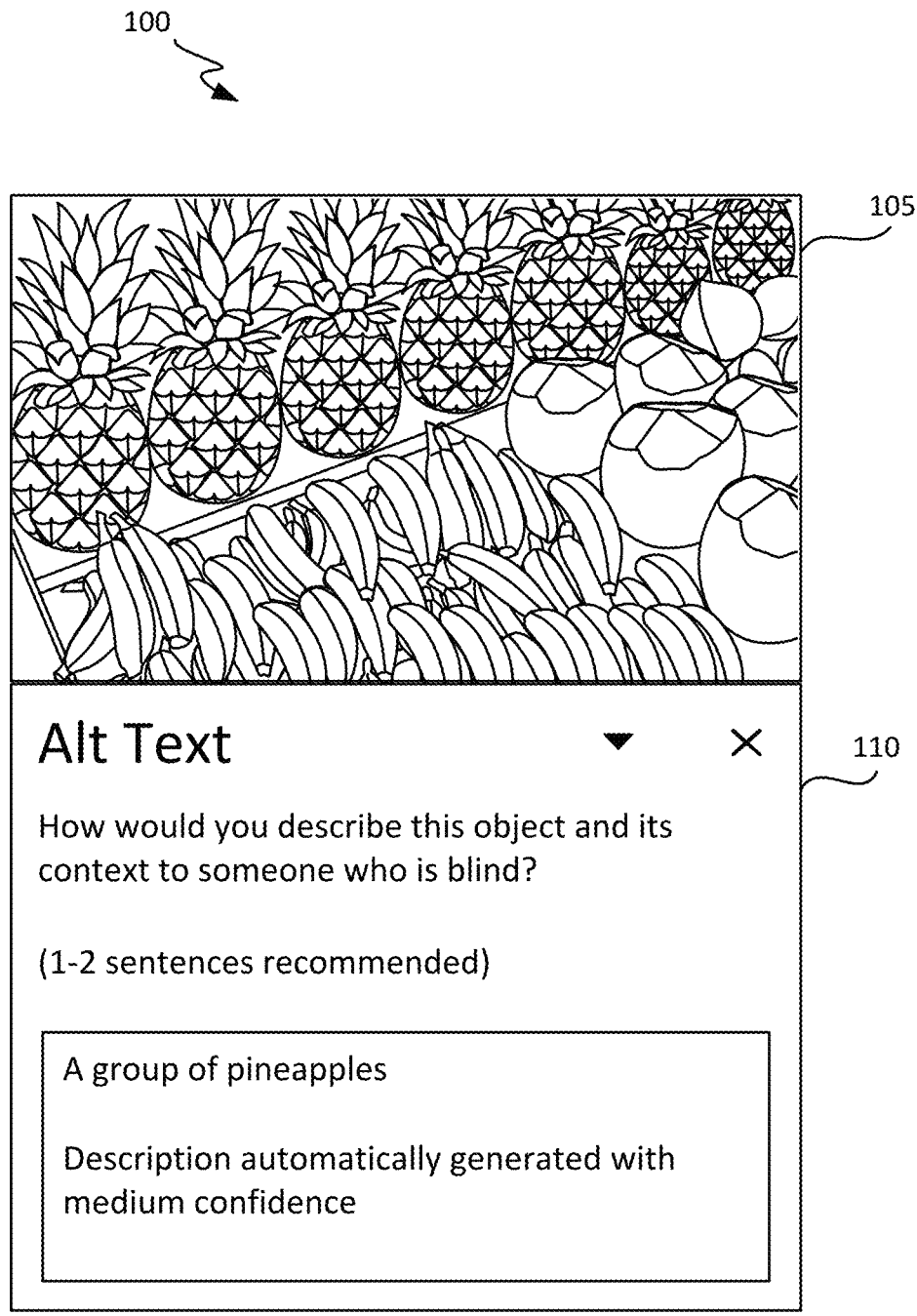
FIG. 1 shows an example digital image that includes multiple objects arranged in an order and an example of an accompanying alt text description, in accordance with some implementations.

This disclosure describes techniques for communicating features of digital images to visually impaired users. A digital image may be displayed on a touch sensitive screen. The digital image may include a plurality of objects. When the digital image is presented to a visually impaired user, an overall description of the digital image may be audible. As the visually impaired user is in contact with first object of the digital image, a description of the first object may be audible. As the contact made by the visually impaired user is transitioned in a direction from the first object to a second object, a description of the second object may be audible. In some implementations, when the visually impaired user is in contact with the first object, a screen vibration unique to the first object may be generated. As the visually impaired user is in contact with the second object, a screen vibration unique to the second object may be generated. The description associated with each of the first and second objects and the screen vibration unique to the first object and to the second object may help providing the visually impaired user a better perception of the digital image including the objects that are included in the digital image, the approximate location of the objects in the digital image, and the spatial relationship among the objects in the digital image. In some implementations, a visually impaired user may use a finger touch to contact an object included in a digital image via a touch sensitive screen. In some implementations, the touch sensitive screen may be associated with an image capturing device which may be used to capture the digital image. In some implementations, the touch sensitive screen may be associated with a display of a computing system used by a visually impaired user to interact with digital images captured by others.

Examples of systems and methods associated with communicating features of digital images to visually impaired users using touch sensitive screens will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

FIG. 1 shows an example digital image that includes multiple objects arranged in an order and an example of an accompanying alt text description, in accordance with some implementations. As shown in diagram 100, the digital image 105 may include many objects. The objects may include different types of fruits arranged in multiple rows, with some fruits occupying one row while some other fruits occupying multiple rows, and with the fruits placed adjacent to one another. The digital image 105 may be included in a document that is being presented to a visually impaired user. For example, the document may be generated using Microsoft Word, a product of Microsoft Corporation of Redmond, Washington.

Using a feature of MS Word, an automatic "alt txt" description 110 of the digital image 105 may be generated. In this example, the description includes a single phrase "a group of pineapples." This description is vague and does not convey to a visually impaired user all the details of the arrangement of the objects which a normal vision user would see in the digital image 105. For example, the description does not include an explanation of all the different fruits, the size of the fruits, what the fruits look like, and the placement of the different fruits relative to one another. Because the description is vague, a visually impaired user may consider the digital image 105 as being low in value with respect to the rest of the document and may miss out on features of the digital image that a normal vision user may find interesting.

Figure 2:
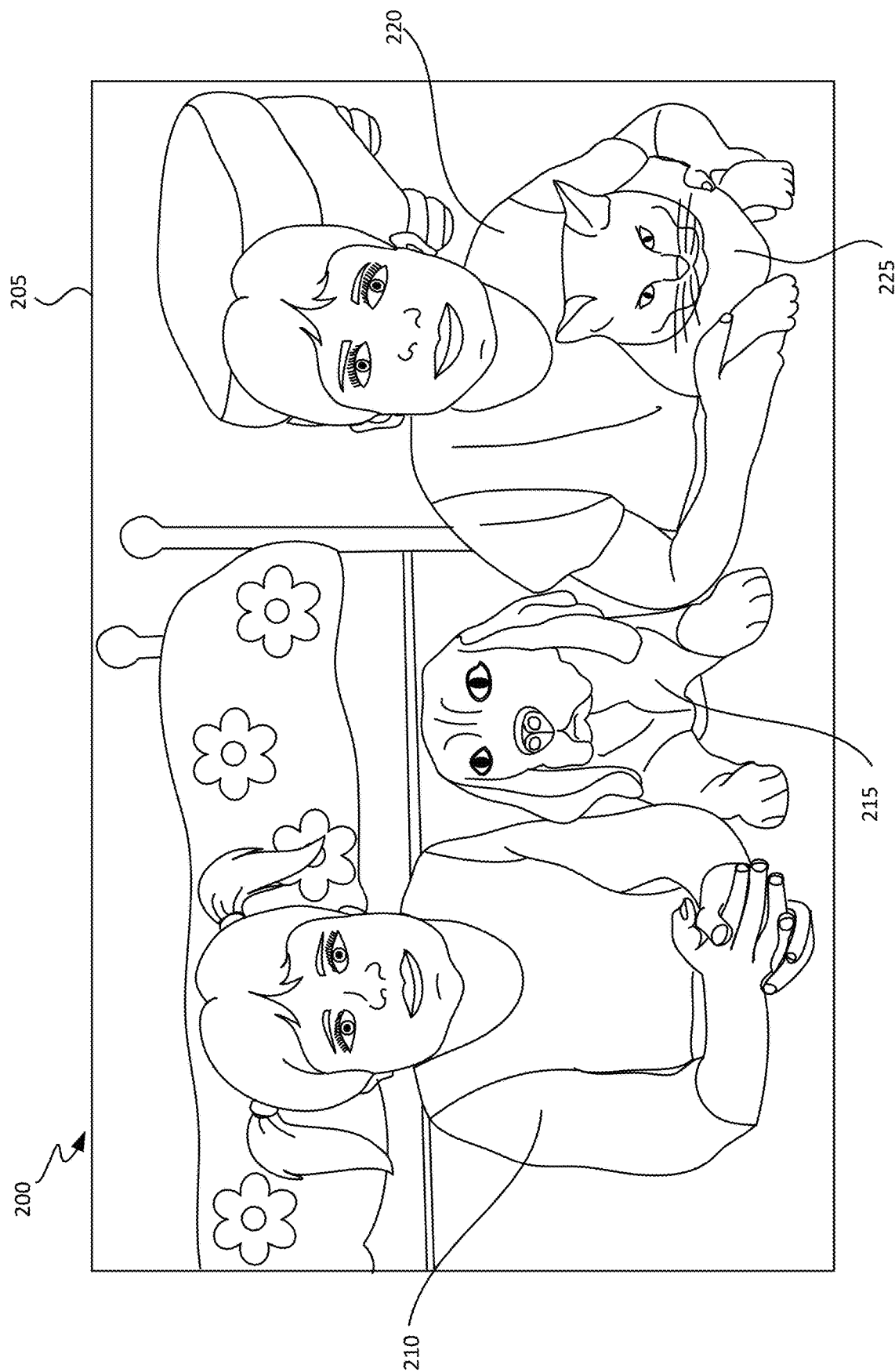
FIG. 2 shows an example digital image that may be processed to help a visually impaired user to perceive features of the digital image, in accordance with some implementations.
Figure 3:
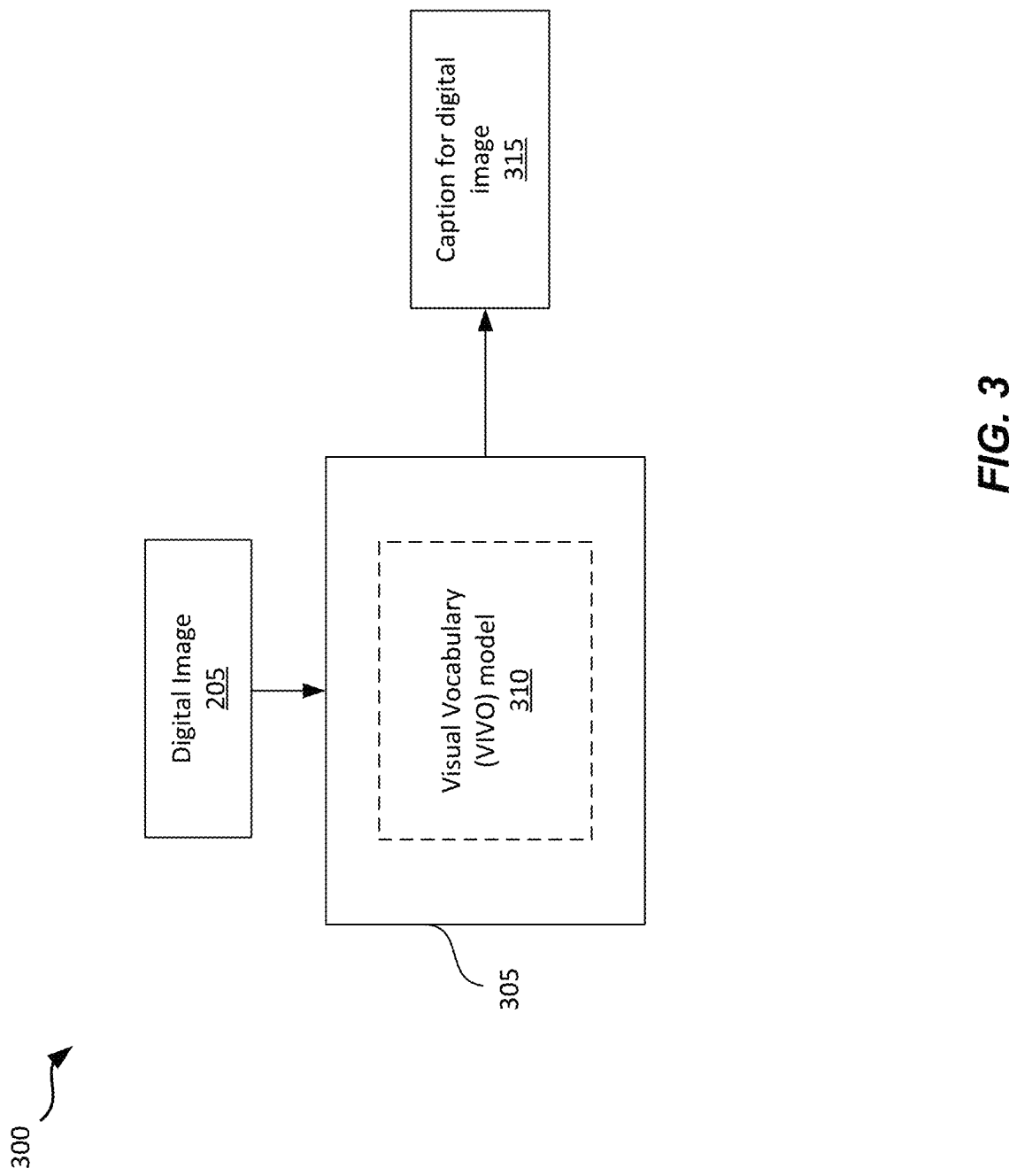
FIG. 3 shows an example image caption generator that may be used to process a digital image to generate a caption, in accordance with some implementations.

FIG. 2 shows an example digital image that may be processed to help a visually impaired user perceive features of the digital image, in accordance with some implementations. FIG. 3 shows an example image caption generator that may be used to process a digital image to generate a caption, in accordance with some implementations. Referring to diagram 200, the digital image 205 may include multiple objects. For example, the multiple objects include a female 210, a first pet 215, a male 220 and a second pet 225. In some implementations, a caption or general image level description of the digital image 205 may be generated by an image caption generator 305 (shown in diagram 300). The image caption generator 305 may be configured to generate the caption 315 using a machine learning (ML) model. In some implementations, the image caption generator 305 may also be configured to provide information related to date, time, and location when the digital image 205 is captured.

In some implementations, the image caption generator 305 may be configured to generate a confidence score. The confidence score may indicate a probability that the caption reflects the features of the digital image 205. In some implementations, the ML model used by the image caption generator to generate captions may be trained using image-word pairs training data. For example, the ML model may be visual vocabulary (VIVO) pre-training 310. VIVO may be used to improve and extend conventional vision-language pre-training (VLP) which uses paired image-sentence training data. VIVO is pretrained using image-word pairs (instead of image-sentence pairs) to build a large-scale visual vocabulary. VIVO pretraining is described in VIVO: Visual Vocabulary Pre-Training for Novel Object Captioning by Xiaowei Hu, Xi Yin, Kevin Lin, Lijuan Wang, Lei Zhang, Jianfeng Gao, and Zicheng Liu, revised 4 Mar. 2021, which is hereby incorporated by reference herein in its entirety.

Figure 4A:
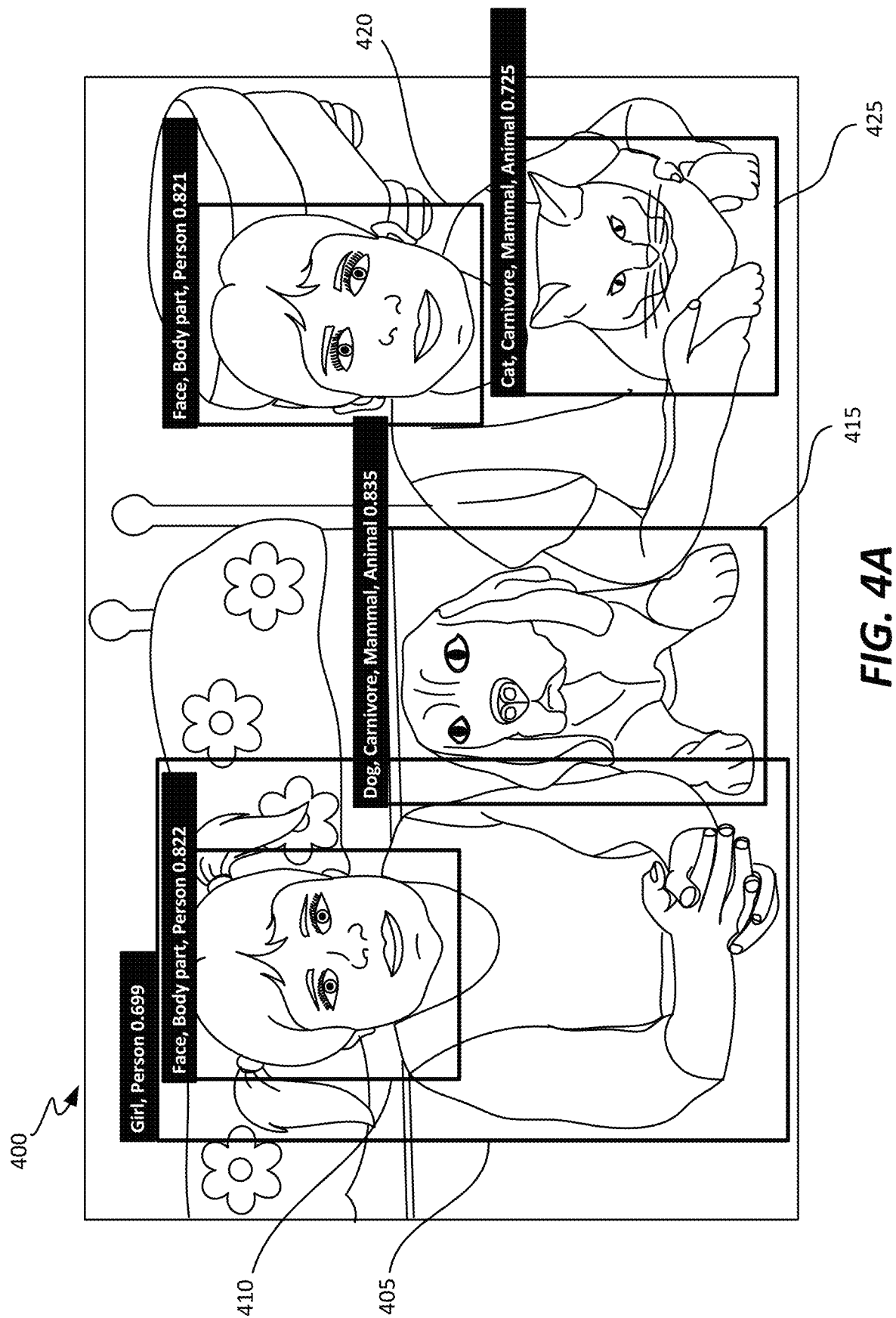
FIG. 4A shows an example of bounding boxes associated with objects included in a digital image, in accordance with some implementations.

FIG. 4A shows an example of bounding boxes associated with objects included in a digital image, in accordance with some implementations. In order to provide a visually impaired user more description of the digital image 205 beyond the general image level description, in some implementations, it may be necessary to identify or detect the objects that are included in the digital image 205. In some implementations, a detected object may be associated with a bounding box to set a boundary for the detected object. The bounding box may be used to enable differentiating when different objects or different parts of an object in the digital image 205 is in contact with a touch by a visually impaired user.

Each bounding box may be associated with a set of coordinates to identify its position on the digital image 205. Referring to diagram 400, the digital image 205 is shown to include bounding box 405 for the female object, bounding box 410 for the face of the female object, bounding box 415 for the first pet object, bounding box 420 for the male object, and bounding box 425 for the second pet object. In some implementations, each of the bounding boxes may be associated with a label vector that includes information about the object. For example, the label vector 430 associated with the bounding box 420 includes the labels "Face", "Body part", and "Person."

In some implementations, a confidence score may be associated with a vector label to indicate a probability that the information included in the label vector correctly describes the object in the bounding box. For example, the confidence score associated with the bounding box 420 is 0.821. The labels included in a label vector may start with a specific label (e.g., "Face") and then a more generalized label (e.g., "Animal"). In some implementations, the labels included in the label vector may be analyzed and the number of labels may be pruned or reduced to generate an updated label vector. For example, the labels in the label vector 430 may be reduced to keep only the label "Face."

Figure 4B:
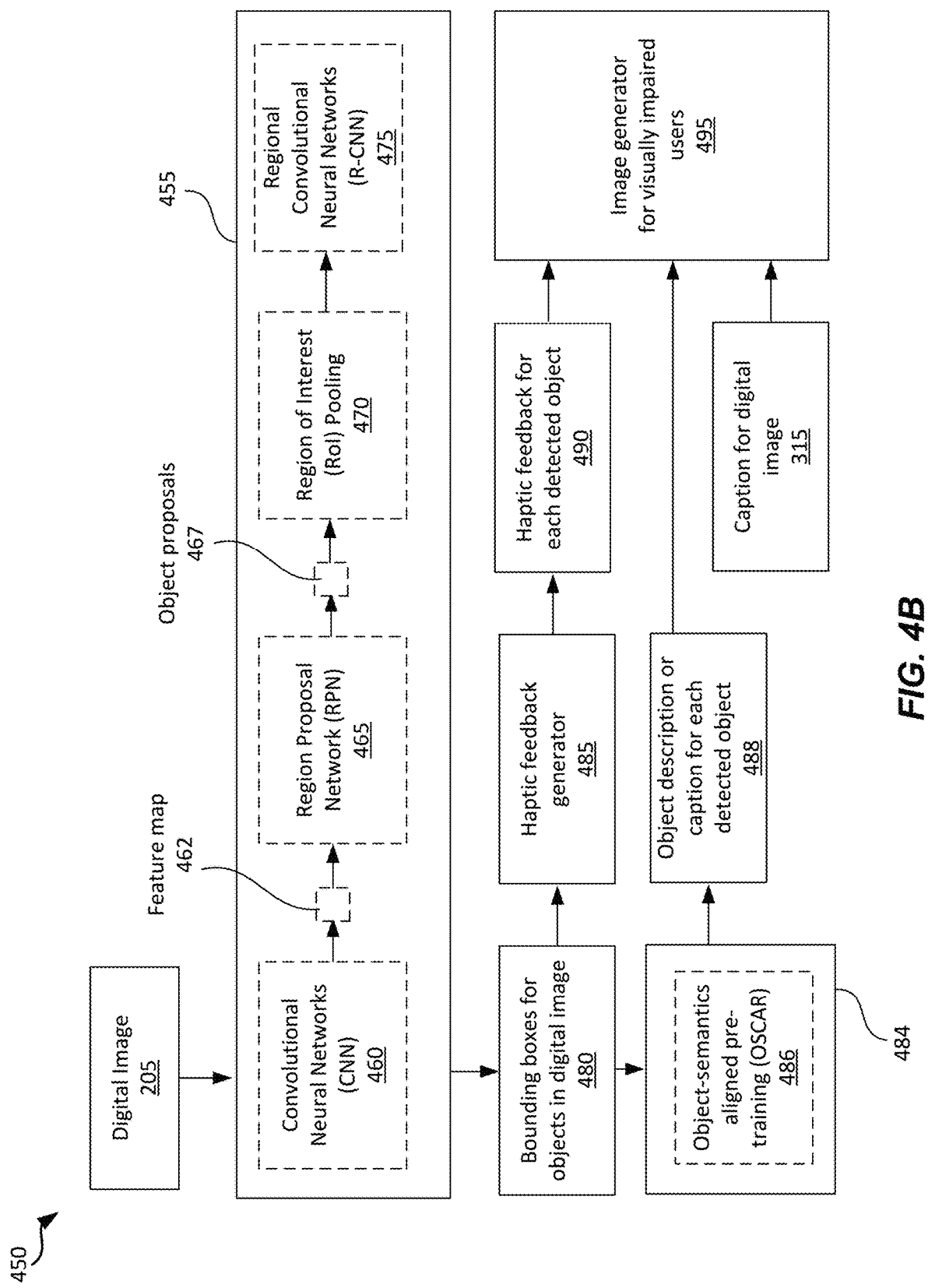
FIG. 4B shows an example of an object detector, in accordance with some implementations.

FIG. 4B shows an example of an object detector, in accordance with some implementations. In diagram 450, object detector 455 may be configured to receive the digital image 205 as input, detect objects included in the digital image 205 and generate information that describes the bounding boxes 480 for the detected objects included in the digital image 205. In some implementations, the object detector 455 may be configured to generate information about the bounding boxes 480 for the detected objects using a ML model.

In some implementations, the ML model used by the object detector 455 may be faster R-CNN (Regions with Convolutional Neural Networks) model. In some implementations, using the faster R-CNN model, the object detector 455 may be configured to generate, based on the input digital image 205, a list of bounding boxes, a label vector assigned to each bounding box, and a confidence score for each label vector. A label vector may include one or more labels. A label may be generated by a classifier associated with the faster R-CNN.

In some implementations, when using the faster R-CNN model, the digital image 205 may be used as input to a CNN 460 which returns feature maps 462 for the digital image 205. The size of the features maps relative to the size of the digital image 205 may be determined by a subsampling ratio used by the CNN 460. A region proposal network (RPN) 465 may be applied to the feature maps 462. The RPN 465 may then generate object proposals 467 along with their confidence scores. A region of interest (RoI) pooling layer 470 may be applied to the object proposals 467. This may include adjusting the object proposals 467 to similar size. The object proposals having the similar size may be passed to regional convolutional neural networks (R-CNN) 475, which may generate the information about the bounding boxes 480 for the detected objects included in the digital image 205.

In some implementations, the R-CNN used by the faster R-CNN model may be ResNet101, which is a convolutional neural network that is 101 layers deep. The faster R-CNN model is described as "Faster R-CNN: Towards Real-Time Object Detection with Region Proposal Networks," in IEEE Transactions on Pattern Analysis and Machine Intelligence, vol. 39, no. 6, pp. 1137-1149, 1 Jun. 2017, doi: 10.1109/TPAMI.2016.2577031, by S. Ren, K. He, R. Girshick and J. Sun, which is hereby incorporated by reference herein in its entirety.

In some implementations, the faster R-CNN model may be trained using bounding box annotated images as training data. For example, the training data may be Open Images (OI) dataset, which is a dataset that includes millions of images with multiple objects per image and millions more of bounding boxes for the objects in the images. The bounding boxes for the OI dataset may have been manually drawn by professional annotators to ensure accuracy and consistency. In addition, the OI dataset may be annotated with image-level labels spanning many classes. For example, the OI dataset version 6 contains approximately 16 million bounding boxes for 600 object classes on 1.9 million images. The OI dataset is open source and may be stored in repositories hosted by a hosting platform for version control and collaboration.

In some implementations, the information about the bounding boxes 480 may be used as input to a haptic feedback generator 485. The haptic feedback generator 485 may include a vibrating component or actuator and may be configured to associate an object in a bounding box with a unique vibration pattern. In some implementations, each of the objects included in the digital image 205 may be assigned a unique vibration pattern. Although not shown, the haptic feedback generator 485 may be associated with a controller which may control which vibration pattern to activate. In some implementation, the controller may be activated based on detecting a touch or contact with a touch sensitive screen.

A touch may be associated with touch coordinates. The touch coordinates may be used to find a bounding box of interest and an object of interest. For example, the controller may activate a first vibration pattern when a visually impaired user touches a first object included in a digital image and a second vibration pattern when the visually impaired user touches a second object included in the digital image. As another example, the controller may change from the first vibration pattern to the second vibration pattern when the controller detects a transition of the touch from the first object to the second object as a visually impaired user moves the finger across the touch sensitive screen.

The change in the vibration pattern may provide a visually impaired user a perception of the size of an object on the digital image 205. In some implementations, to generate the haptic feedback, haptic feedback application programming interfaces (APIs) may be used. Different devices and different platforms may have different haptic feedback APIs. For example, a mobile device implemented on an Android platform may be associated with VibrationEffect APIs which may be used by developers to specify a wave pattern to cause the device to vibrate.

In some implementations, the object description generator 484 may be configured to use information about the bounding boxes 480 to generate object description or caption 488 for each of the objects included in the digital image 205. In some implementations, the description about an object may be generated based on the information included in the label vector associated with the bounding box that includes the object. For example, the label vector 430 of the bounding box 420 shown in FIG. 4A may include the labels "face", "body part" and "person."

When a visually impaired user touches a first object, a description of the first object may be audible. When the visually impaired user moves the finger across the touch sensitive screen and touches a second object, a description of the second object may be audible. This change in the description from the first object to the second object may provide a visually impaired user a perception of a relative position or placement of the first object from the second object.

In some implementations, the object description generator 484 may be configured to use a ML model to generate the object description 488. In some implementations, the ML model used by the object description generator 484 may be, for example, object-semantics aligned pre-training (OSCAR) model 486. The OSCAR model 486 may be used to generate local contextual captions which are personalized as well as apt for local regions. The OSCAR model 486 is described in "Oscar: Object-Semantics Aligned Pre-training for Vision-Language Tasks by Xiujun Li, Xi Yin, Chunyuan Li, Pengchuan Zhang, Xiaowei Hu, Lei Zhang, Lijuan Wang, Houdong Hu, Li Dong, Furu Wei, Yejin Choi, and Jianfeng Gao, version 5, revised 26 Jul. 2020, which is hereby incorporated by reference herein in its entirety.

Figure 5:
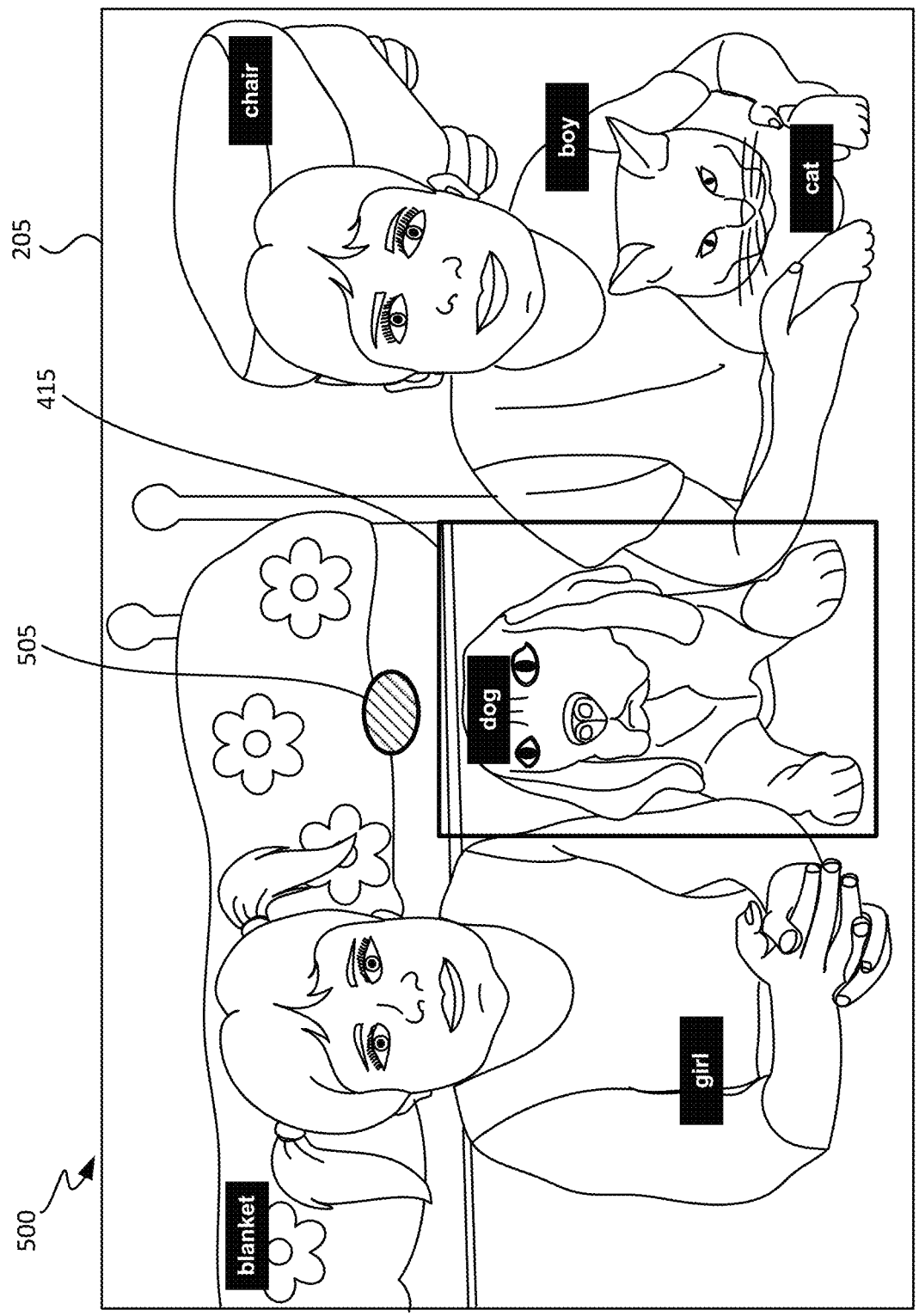
FIG. 5 shows an example of a digital image with object tags, in accordance with some implementations.

FIG. 5 shows an example of a digital image with object tags, in accordance with some implementations. When using the faster R-CNN model (which may, among other things, generate bounding boxes (or proposals therefor) as discussed above), the digital image 205 may be represented as a set of region features. Each of the region features may be associated with an object tag. An object tag may be generated using, e.g., an OIDetector function of the OpenISS motion capture data aggregation and delivery framework. An image may be associated with multiple object tags. Each object tag may be a word. For example, as shown in diagram 500, the object tags may be "boy", "dog", "cat", "girl", "blanket" and "chair." Since each object tag may be a word, a textual sentence or a caption may be generated using multiple object tags. As such, a textual sentence may be represented as a sequence of word embeddings using pre-trained language models such as, for example, bidirectional encoder representations from transformers (BERT). The BERT model is pre-trained on millions of text-image pairs. The BERT model receives as input and leverages object tags detected in images as anchor points toward forming sentences that may be aligned with the content of the image. The BERT model is described in "BERT: Pre-training of Deep Bidirectional Transformers for Language Understanding," by Jacob Devlin, Ming-Wei Chang, Kenton Lee, Kristina Toutanova, Version 2, revised May 24, 2019, which is hereby incorporated by reference herein in its entirety.

In some implementations, each of the object tags associated with the region features may be assigned a weight. The weight may be higher for object tags that are closer to a region that is being touched via a touch sensitive screen. For example, when the region 505 is touched, the object tag "dog" may be assigned a higher weight than the other object tags that may be located further away. Touch coordinates may be used to determine the position of a touch.

In some implementations, an object tag that is found in a bounding box may be assigned a higher weight than an object tag that is found outside of a bounding box. For example, the object tag "dog" is inside the bounding box 415 and may be assigned a higher weight than other object tags that are not inside the bounding box 415.

In some implementations, generic object tags may be replaced with more personalized object tags such as, for example, people names. The replacement of the generic object tags with the personalized object tags may be based on data previously stored by a user. For example, a visually impaired user may be associated with a catalog of images where many of the images of people have been tagged with their names. By matching a person object associated with a generic object tag with an image stored in the catalog, the person's name may be used as an object tag instead of the generic object tag. In some implementations, matching operations may need to be performed to match an object in the digital image 205 with a previously stored digital image that has been tagged with a name. For example, the matching operations may be performed by a facial recognition application. Using the personalize object tags, the caption may be more customized or personalized. For example, instead of a caption that says, "boy sitting on a couch", a more personalized caption may say "Michael is sitting on a couch," where "Michael" is a personalize object tag replacing the generic object tag "boy".

In some implementation, common objects in context (COCO) data set may be used as training data for the OSCAR model. The COCO dataset is a large-scale object detection, segmentation, and captioning dataset, and images in the dataset may be everyday objects captured from everyday scenes. The COCO dataset may include image-caption pairs. The training for the OSCAR model may include quadruplets of the object tag, the weight of the object tag (from 0 to 1, as described below with respect to FIG. 11A), region features corresponding to a bounding box, and image-caption pairs from the COCO data set. In some implementation, an object tag and its weight may be used to generate a caption for an object. An object tag with higher weight may be more likely to be used to generate a caption as compared to an object tag with lesser weight, enabling dynamic generation of captions that alter based on, e.g., which object is given more weight.

In some implementations, the object description or caption 488 for each of the detected objects, the haptic feedback 490 for each of the detected objects and the caption 315

(shown in FIG. 3) for the digital image 205 may be used by image generator 495 to enable features of the digital image 205 to be better perceived by the visually impaired users as compared to conventional techniques. For example, it may be possible for a visually impaired user to listen to a description of the first object while, at the same time, feel the vibration pattern associated with the first object as the visually impaired user touches the first object via a touch sensitive screen.

Figure 6A:
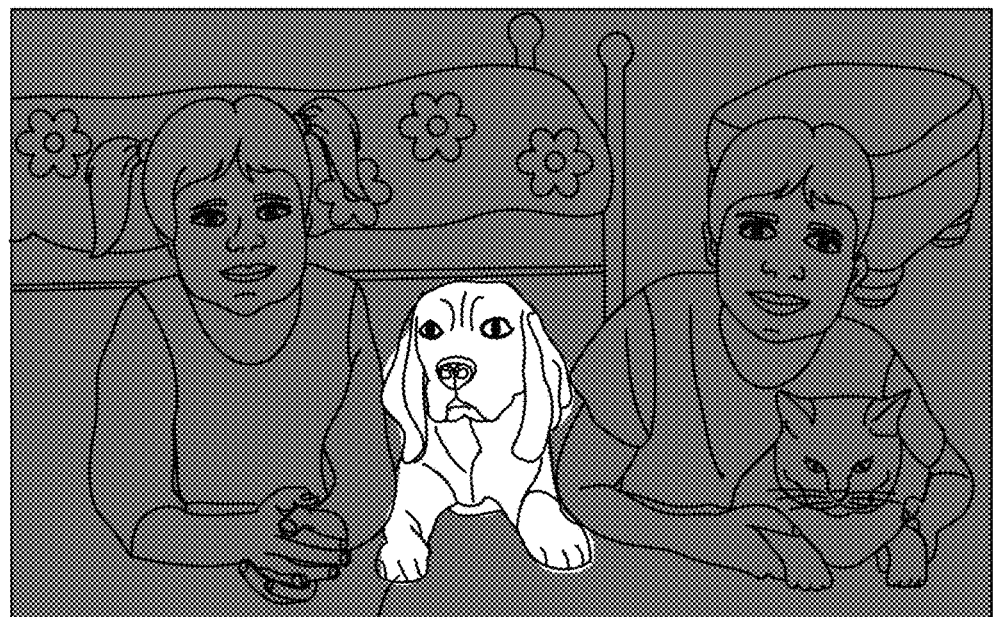
FIGS. 6A-6B show an example of a mask of an object in a digital image, in accordance with some implementations.
Figure 6B:
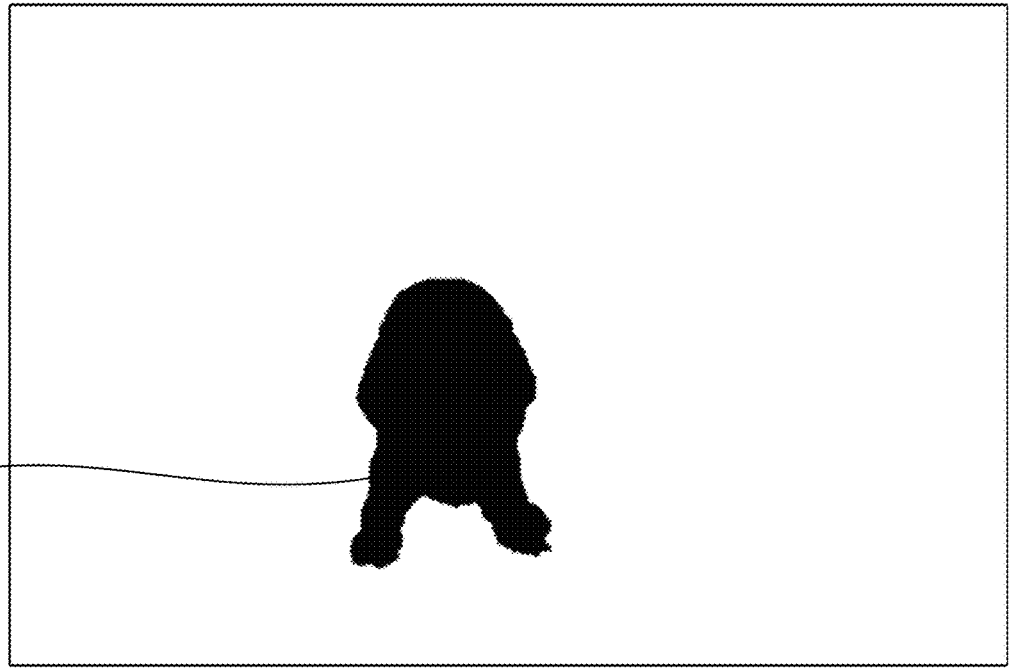

FIGS. 6A-6B show an example of a mask of an object in a digital image, in accordance with some implementations. Each of the objects detected in the digital image 205 may be associated with a mask. For example, the dog 215 in FIG. 6A is associated with a mask 615 shown in FIG. 6B. FIG. 6C shows an example of a mask generator, in accordance with some implementations. Mask generator 605 may be configured to receive information about the bounding boxes 480 (shown in FIGS. 4A and 4B) for the objects in the digital image 205 and generate a mask 610 for each of the objects. In some implementations, the mask generator 605 may be configured to analyze the area within a bounding box to identify the outline of the object included in the bounding box and generate the mask 610 based on the outline. In some implementations, the mask generator 605 may be configured to use the information included in the updated label vector (described with FIG. 4A) to generate a mask for an object included in the bounding box. For example, when a label indicates that the object is a portrait, operations that are designed to generate a mask for a portrait may be performed. When the label indicates that the object is an animal, operations that are designed to generate a mask for an animal may be performed. In some implementations, the mask generator 605 may be configured to use a machine learning model to generate a mask. For example, the machine learning model may be trained using object-mask pairs as training data. The object-mask pairs may be finetuned with specific set of data for the type of objects to generate the masks for. For example, the data for finetuning data may include animal-mask pairs to enable the mask generator 605 to generate masks for digital images that include animal objects.

Figure 7:
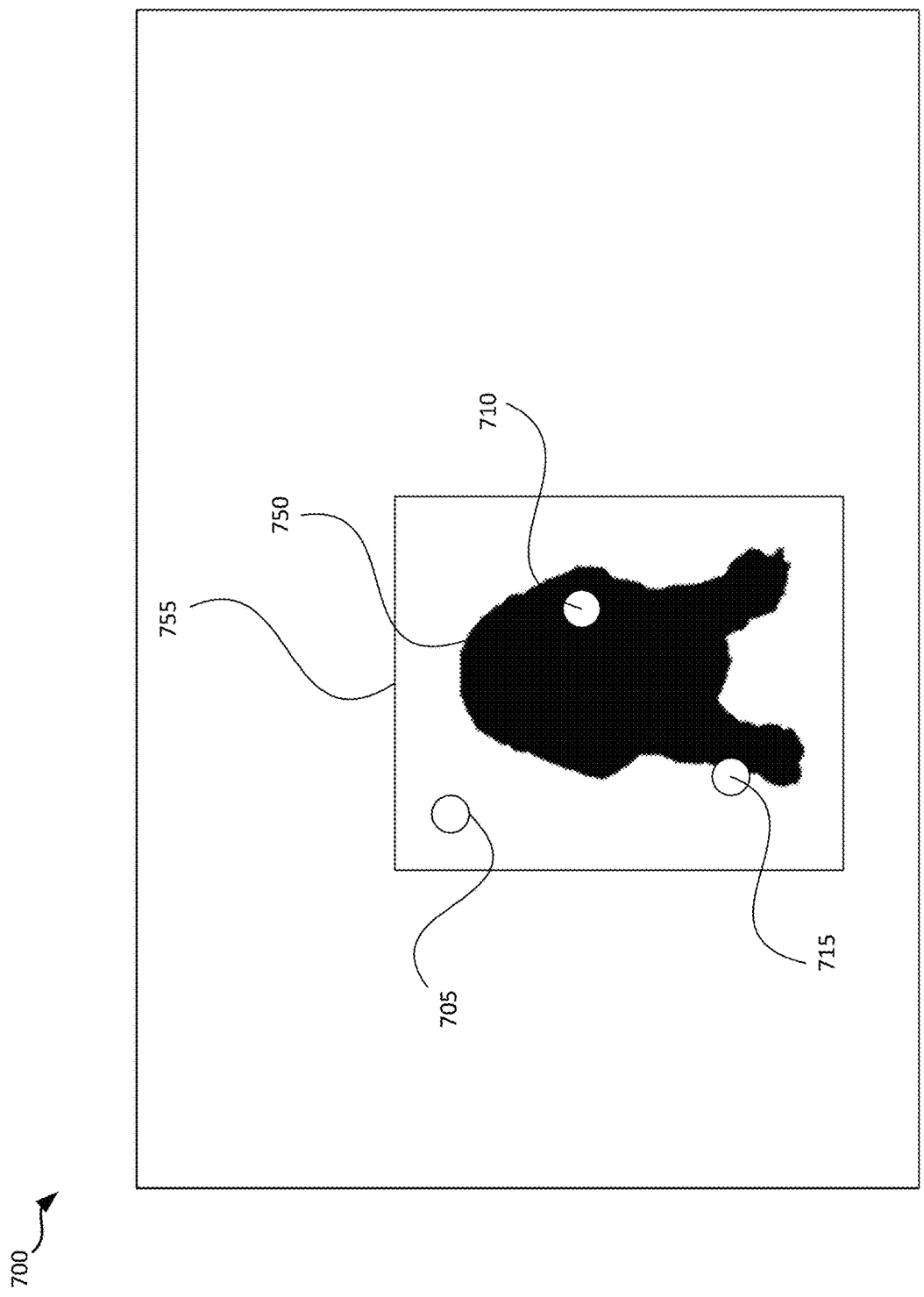
FIG. 7 shows an example of using an object mask to detect a touch contact with an object, in accordance with some implementations.

FIG. 7 shows an example of using an object mask to detect a touch contact with an object, in accordance with some implementations. Diagram 700 includes an object mask 515 and its associated bounding box 415. The diagram 700 also includes three possible touch areas 705, 710 and 715 that a visually impaired user may initiate. The touch areas 705, 710 and 715 are shown to be within the bounding box 415.

In some implementations, the information about the objects detected by the object detector 455 (shown in FIG. 4B) including the information about the bounding boxes 480 may be stored in a storage device. It may be possible that when a visually impaired user touches an area on a touch sensitive screen that displays the digital image 205, the touch may be in within one bounding box and may be outside of another bounding box. It may be possible that the touch may be in an area where there may be multiple overlapping bounding boxes.

In some implementations, screen coordinates for each bounding box may be determined. In some implementations, when a touch is detected, the image generator 495 (shown in FIG. 4B) may be configured to evaluate the information (e.g., the screen coordinates) about each of the bounding boxes 480 and the touch coordinates associated with a touch to determine whether the bounding box contains the touch coordinates. A list of the bounding boxes that contain the touch coordinates may be formed.

It may be noted that when a touch is determined to be within a bounding box, the touch may or may not be in contact with the object in the bounding box. For example, the touch area 705 is not in contact with the object 515, and the touch area 710 is in full contact with the object 515, while the touch area 715 is in partial contact with the object 515. In some implementations, the list of the bounding boxes that contain the touch coordinates may be arranged in an ascending order of the bound area of each bounding box. In some implementations, each bounding box in the ascending order of bound area may be evaluated to determine whether the touch coordinates are within an area of the mask associated with that bounding box.

In some implementations, a contact may be determined based on whether the mask contains a pixel value at the touch area. For example, a value of 0 means there is no contact with an object, and a value of 1 means there is contact with the object. The first bounding box associated with a mask that satisfies the value condition may be considered the bounding box of interest. In some implementations, when a bounding box of interest is identified, the caption or description of the object included in the bounding box may be audible. In addition, or in an alternative, the vibration pattern associated with the object may be generated.

In some implementations, the digital image 205 (shown in FIG. 1) may be captured using an image capturing device that is configured for use by a visually impaired user. For example, the image capturing device may be a smart phone or a tablet computing device. When a digital image 205 is captured, the operations described above may be performed to generate a caption 315 of the digital image, a caption 488 for each of the objects in the digital image 205, and a haptic feedback 490 for each of the objects in the digital image 205. The visually impaired user may touch on a touch sensitive screen of the image capturing device to perceive features of the digital image 205.

Figure 8:
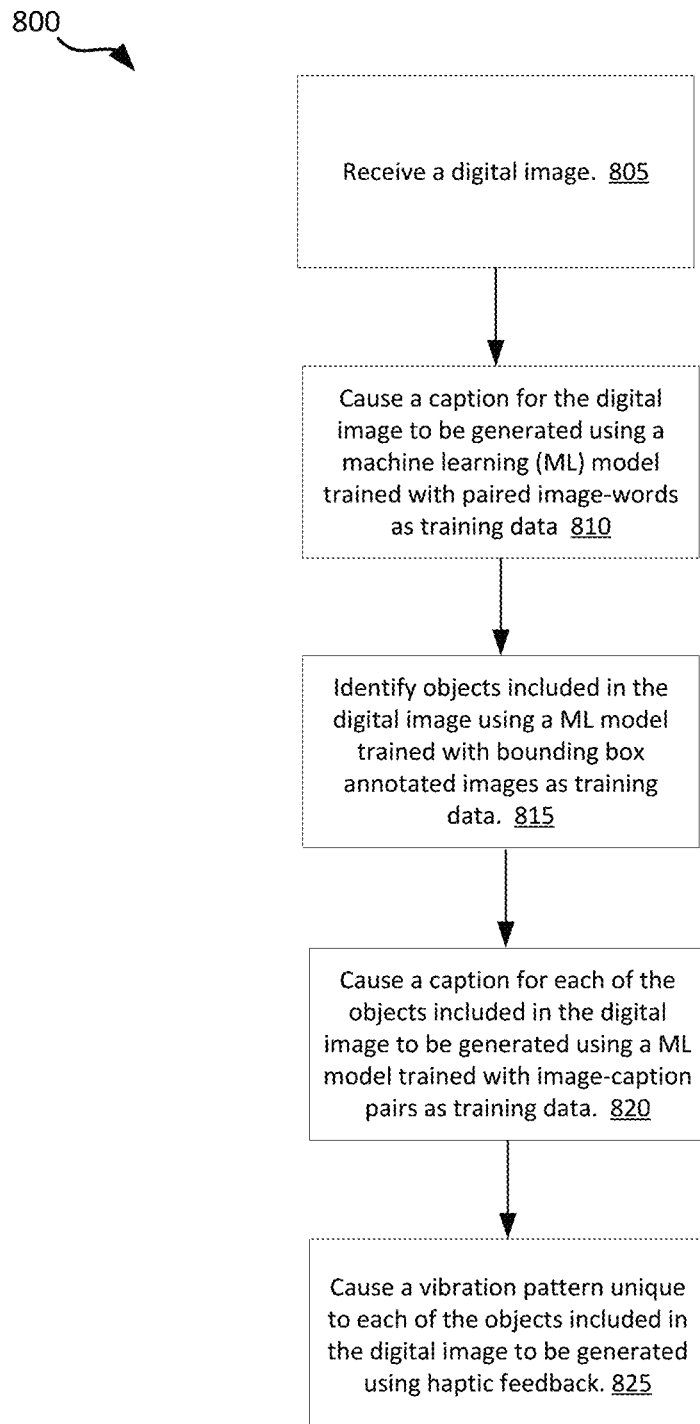
FIG. 8 shows an example process that may be performed to enable visually impaired users to perceive features of a digital image, in accordance with some implementations.

FIG. 8 shows an example process that may be performed to enable visually impaired users to perceive features of a digital image, in accordance with some implementations. In some implementations, process 800 may be performed by a server computing system. For example, the server computing system may receive digital images and enhance the images with features that enable visually impaired users to appreciate the content of the digital images. In some implementations, the process 800 may be performed in connection with a user computing system coupled with a server computing system. For example, a user computing system may be used to capture the digital images that may be processed by the server computing system. Although the blocks of the process 800 are presented in the order shown, it's possible that, in some implementations, the operations associated with these blocks may execute substantially in parallel or in a different order.

The process 800 may start at block 805 where a digital image is received. The digital image may be received based on having been captured by an image capturing device, or the digital image may have been captured during an earlier time period and is being included in a digital media. For example, the digital media may be an electronic document such as a Word document. The digital image may include multiple objects.

At block 810, a caption for the digital image may be automatically generated using a ML model trained using paired image-words as training data. For example, the ML model may be the VIVO model described with FIG. 3. The caption for the digital image may be caused to be audible to a visually impaired user. At block 815, the multiple objects included in the digital image may be detected using a ML model trained using bounding box annotated images as training data. For example, the ML model may be the faster R-CNN model described with FIG. 4B.

At block 820, a caption or description for each of the detected objects in the digital image may be generated using a ML model trained using image-caption pairs as training data. For example, the ML model may be the OSCAR model described with FIG. 4B. The caption for each of the objects may be caused to be audible. At block 825, a vibration pattern unique to each of the objects included in the digital image may be generated using haptic feedback. The vibration pattern may be caused to be perceived by a visually impaired user by sending an electrical waveform to a controller associated with a touch sensitive screen.

Figure 9:
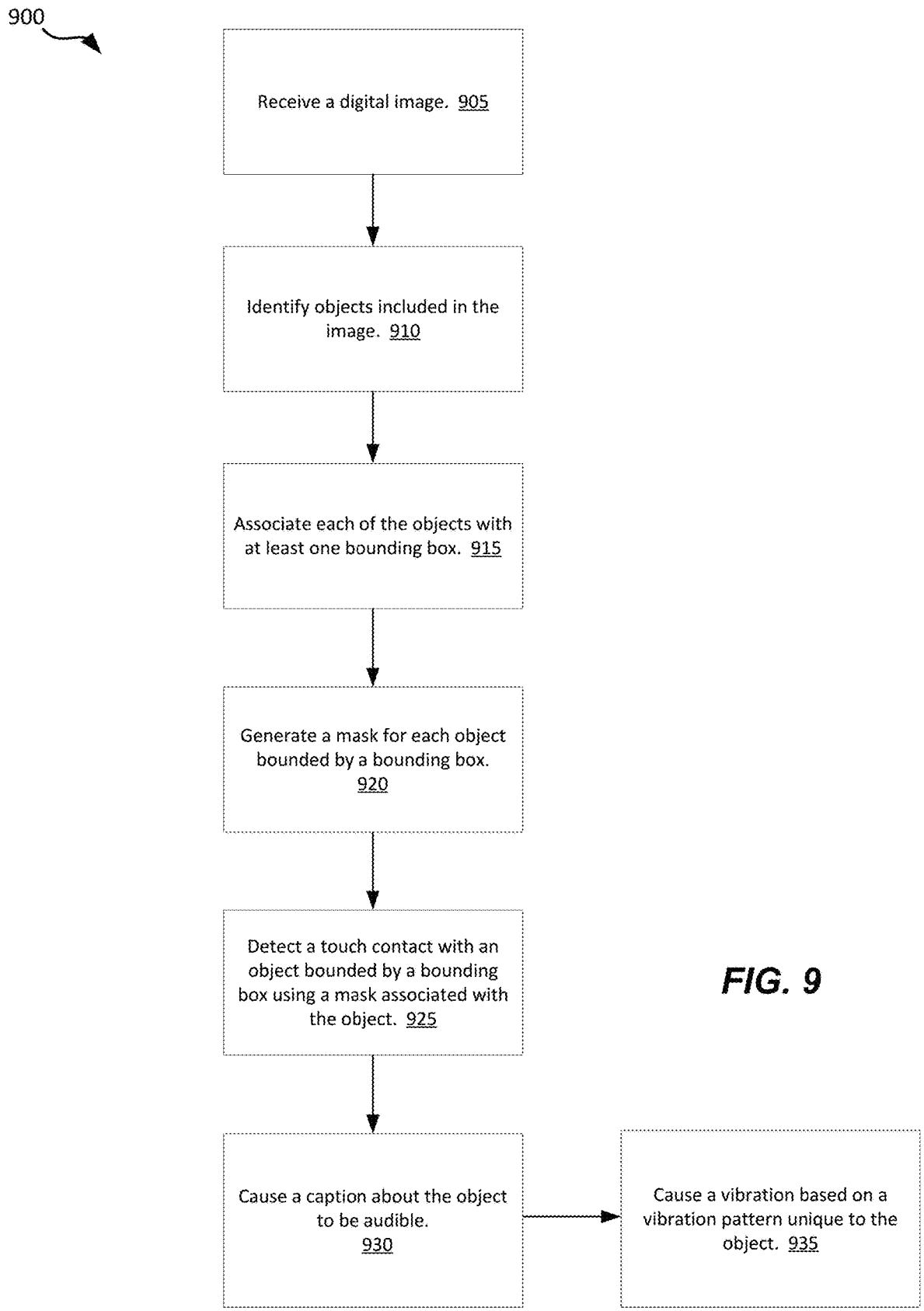
FIG. 9 shows an example process that may be performed using object masks, in accordance with some implementations.

FIG. 9 shows an example process that may be performed using object masks, in accordance with some implementations. In some implementations, process 900 may be performed by a server computing system. For example, the server computing system may receive digital images, generate the masks for the objects and store the masks in a storage device. Although the blocks of the process 900 are presented in the order shown, it's possible that, in some implementations, the operations associated with these blocks may execute substantially in parallel or in a different order.

The process 900 may start at block 905 where a digital image is received. The digital image may include multiple objects. At block 910, the objected included in the digital image may be detected. The detection of the objects may be performed by the object detector 455 (described with FIG. 4B). At block 915, each detected object may be associated with a bounding box. It may be possible to have an object that is associated with more than one bounding box. For example, a person object may have a small bounding box associated with the person's face, and a large bounding box associated with the person's upper half.

At block 920, a mask may be generated for each object that is associated with a bounding box. An example of a mask is described with FIGS. 5A-5B and FIG. 6. At block 925, a contact with an object bounded by a bounding box may be detected. For example, the contact may be made by applying a finger touch on a touch sensitive screen. Operations may need to be performed to confirm that the contact is made with the object and not just made with any area within a bounding box associated with the object. This may be accomplished by comparing the coordinates of the touch with the color of the pixel associated with the mask, as described with FIG. 6.

At block 930, when a contact with an object is confirmed, a caption associated with the object and a vibration pattern unique to object to be perceived by a visually impaired user. For example, the caption about the object may become audible, and the touch sensitive screen may vibrate in a unique pattern associated with the object.

Figure 10:
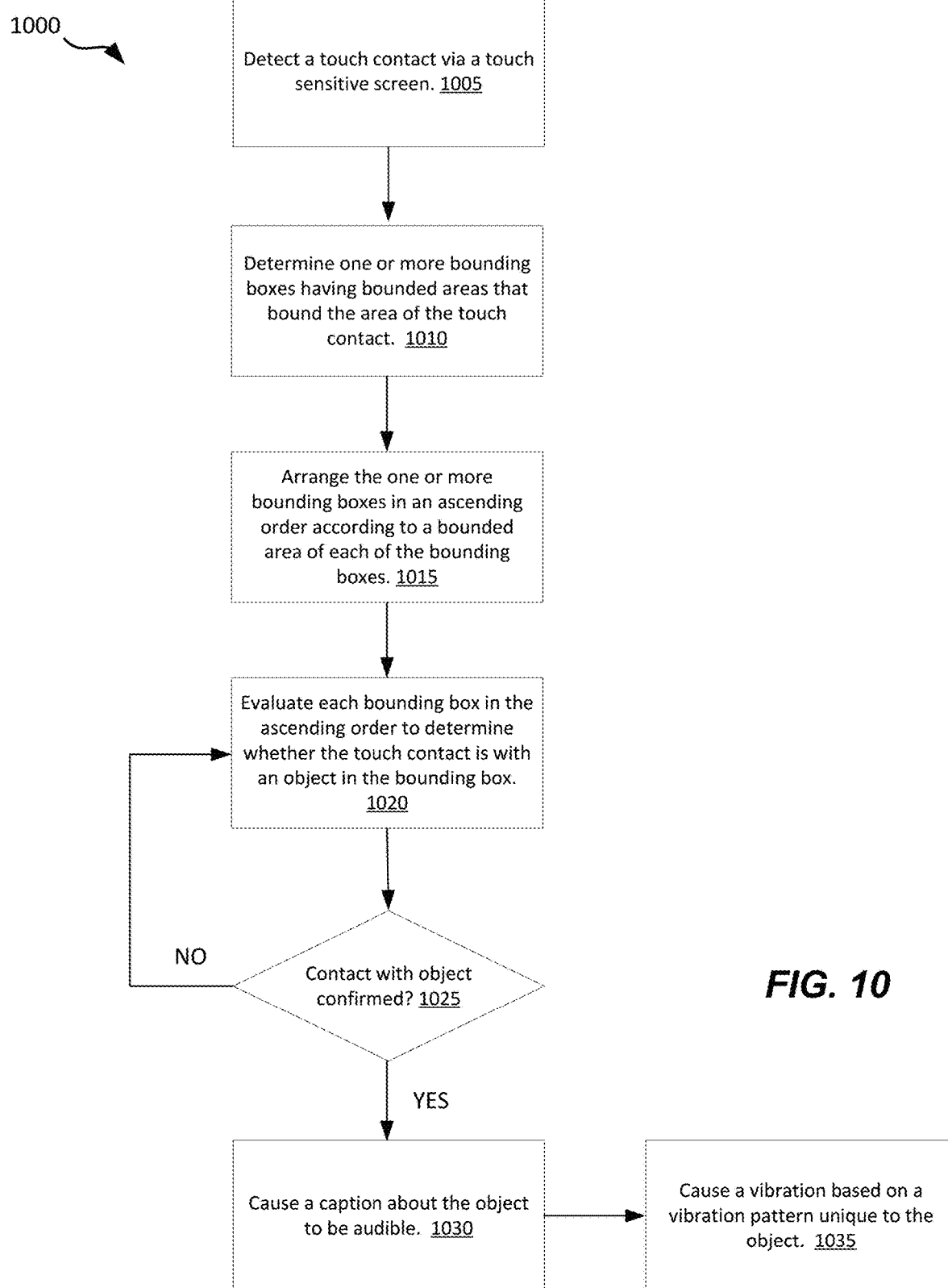
FIG. 10 shows an example process that may be performed to determine an object contacted by a touch, in accordance with some implementations.

FIG. 10 shows an example process that may be performed to determine an object contacted by a touch, in accordance with some implementations. In some implementations, process 1000 may be performed by a server computing system. For example, when a touch is detected, the server computing system may be configured to perform operations to identify an area of the touch and determine whether the area is inside a bounding box of an object. Although the blocks of the process 1000 are presented in the order shown, it's possible that, in some implementations, the operations associated with these blocks may execute substantially in parallel or in a different order.

The process 1000 may start at block 1005 where a touch on a touch sensitive screen may be detected. The touch may be generated by a visually impaired user interacting with a digital image being displayed on the touch sensitive screen. In some implementations, the touch may be a finger touch, and the touch sensitive screen may be associated with a computing device of the visually impaired user. The touch may contact with an area of the touch sensitive screen that may or may not be associated with a bounding box.

It may be possible that the touch may contact with an area that is associated with multiple bounding boxes. For example, such a situation may occur when multiple objects are positioned close to one another and partially overlapping one another. At block 1010, operations may be performed to determine the bounding boxes that have the bounded areas that includes the coordinates of the area associated with the touch. At block 1015, the bounding boxes identified in block 1010 may arranged in an ascending order according to a bounded area of each of the bounding boxes. For example, a bounding box with a smallest bounded area may be at the top of the ascending order.

At block 1020, starting with the bounding box with the smallest bounded area, each bounding box in the ascending order may be evaluated. The evaluation may be based on an object mask associated with each bounding box and the area contacted by the touch. At block 1025, an object mask associated with a bounding box may be used to determine whether the object is contacted by the touch. If no contact is made, the process 1000 may flow from block 1025 back to block 1020 where a next bounding box in the ascending order is evaluated. From the block 1025, if contact with an object mask is determined, the process may flow from block 1025 to block 1030 where a caption about the object and a vibration pattern unique to object may be presented to the visually impaired user. The caption may be audible via a speaker associated with the touch sensitive screen, and the vibration pattern may be felt based on a vibration of the touch sensitive screen.

Figure 11A:
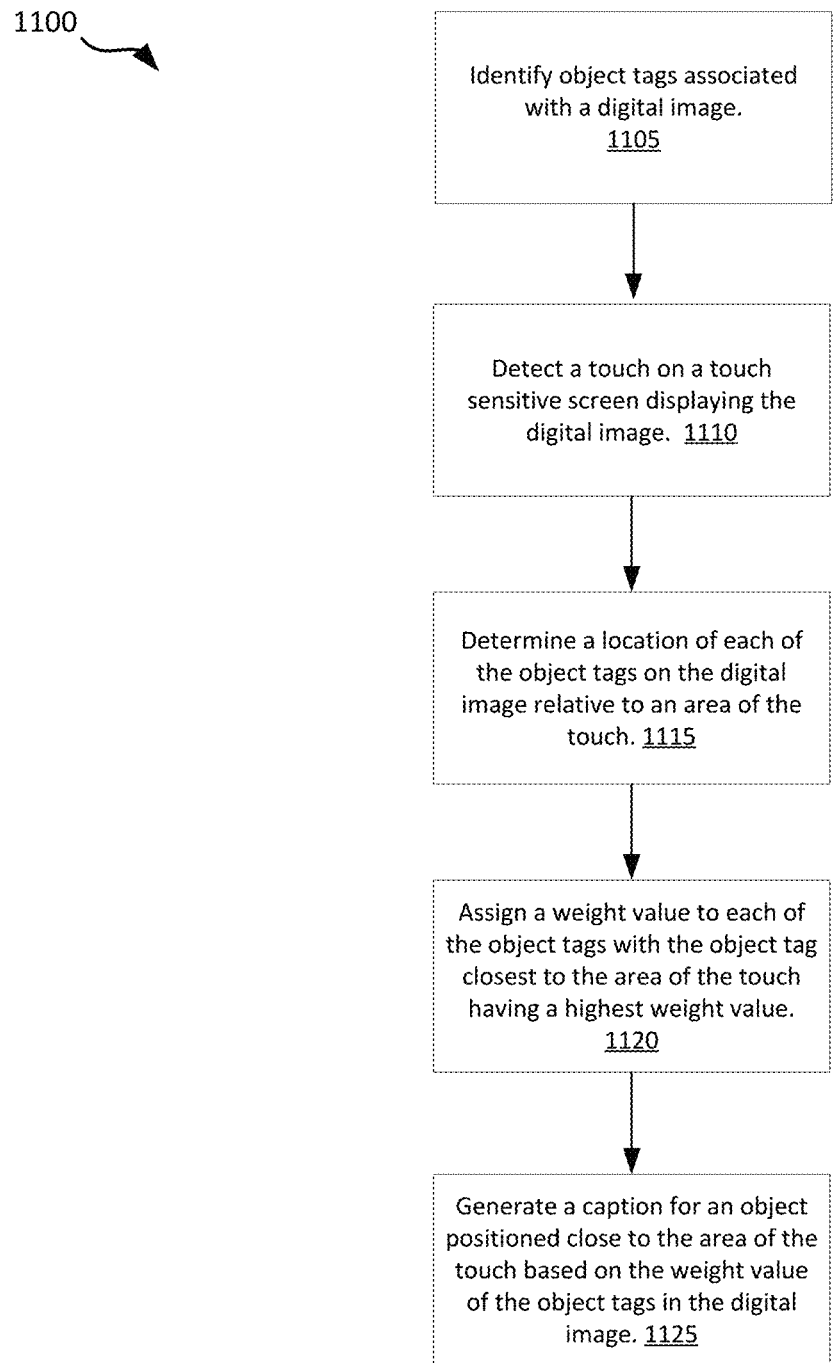
FIG. 11A shows an example process that may be performed to determine a weight of an object tag based on an area of touch, in accordance with some implementations.

FIG. 11A shows an example process that may be performed to determine a weight of an object tag based on an area of touch, in accordance with some implementations. The object tags may be associated with region features (as described with FIG. 5) of a digital image. In some implementations, process 1100 may be performed by a server computing system. For example, the server computing system may be configured to generate a caption for an object detected in a digital image based on one or more object tags. Although the blocks of the process 1100 are presented in the order shown, it's possible that, in some implementations, the operations associated with these blocks may execute substantially in parallel or in a different order.

The process 1100 may start at block 1105 where object tags associated with a digital image may be identified. Examples of object tags are shown in FIG. 5. At block 1110, a touch on a touch sensitive screen that is used to display the digital image may be detected. The touch may be initiated by a visually impaired user as a finger touch. At block 1115, each of the object tags identified in block 1105 may be evaluated to determine their locations relative to the area of the touch. For example, screen coordinates associated with an object tag and screen coordinates associated with the area of the touch may be used.

At block 1120, a weight value may be assigned to each of the object tags based on their location relative to the area of the touch. An object tag that is closer to the area of the touch may be assigned a higher weight than an object tag that further from the area of the touch. For example, as shown in FIG. 5, the object tag "dog" may be assigned a higher weight value than the object tag "cat" relative to the area 505 of the touch. At block 1125, the weight values assigned to each of the object tags and the object tags may be used in generating a caption for an object positioned close to the area of the touch.

More specifically, in some implementations, weight values assigned at block 1120 may be determined based on a probability or likelihood regarding which object or word is associated with the area of the touch and should be included during caption generation at block 1125. Such likelihood may be based at least on a distance between the object and the area of the touch. A weight value may be high for an object right under the area of the touch and decrease for objects farther from this point. Referring to FIG. 7 as an illustrative example, touch area 710 may be assigned the maximum weight value (e.g., 1.0 from a range of 0 to 1), touch area 715 may be assigned a lower weight value (e.g., 0.8), and touch area 710 may be assigned an even lower weight value (e.g., 0.3). Generally, the weight value assigned to an object tag may be determined as follows:

$$W(x) = 1 - \frac{\|(ObjectToBeConsidered(x) - \text{Touch}(x)\|}{\text{Touch}(x)}$$

where x is the object tag, Touch(x) represents the location (e.g., coordinates) of the area of the touch, and ObjectToBeConsidered(x) represents the location (associated with, e.g., the perimeter of a mask or a bounding box) of the object associated with the object tag.

Figure 11B:
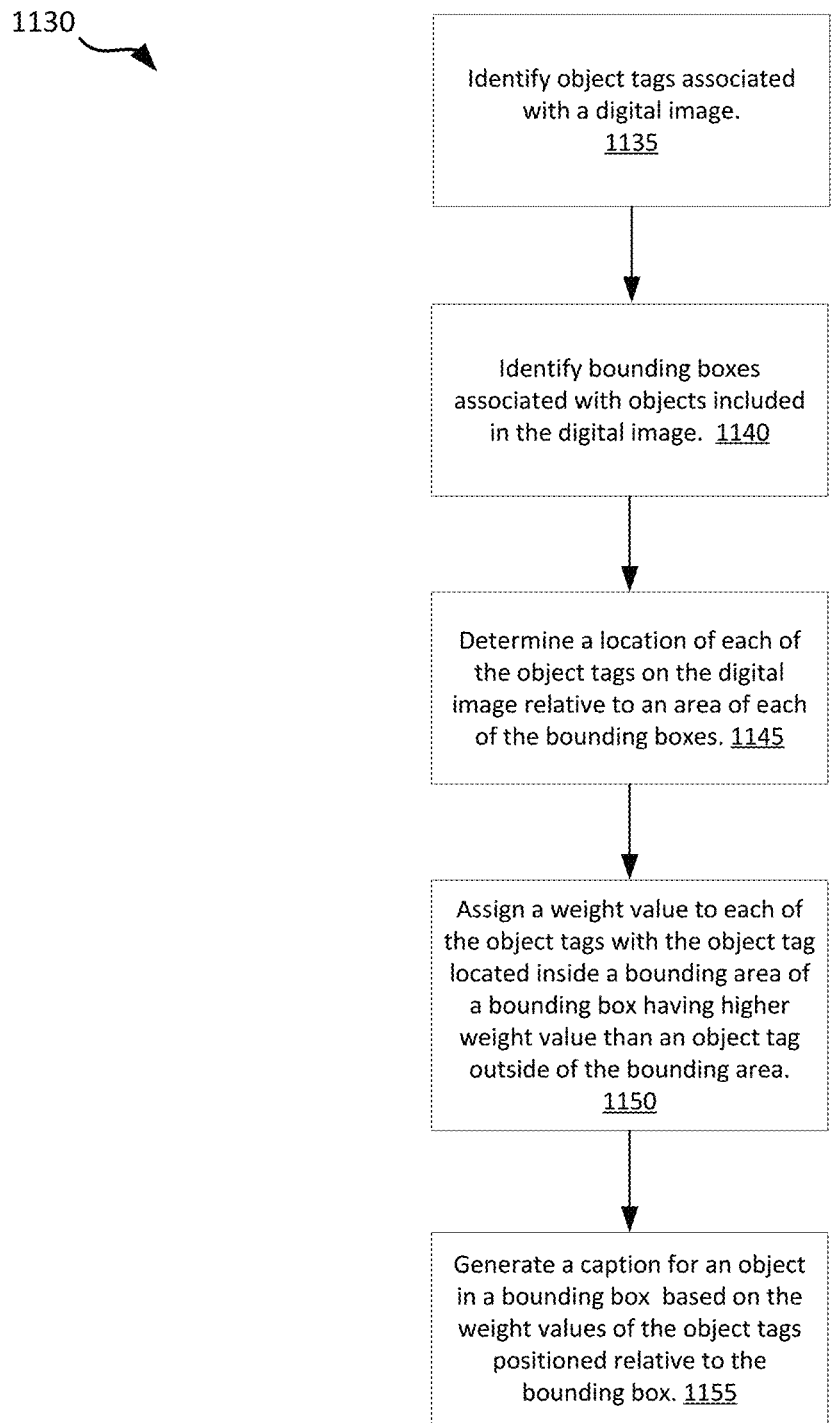
FIG. 11B shows an example process that may be performed to determine a weight of an object tag based on the bounding boxes associated with a digital image, in accordance with some implementations.

FIG. 11B shows an example process that may be performed to determine a weight of an object tag based on the bounding boxes associated with a digital image, in accordance with some implementations. Although the blocks of the process 1130 are presented in the order shown, it's possible that, in some implementations, the operations associated with these blocks may execute substantially in parallel or in a different order. In some implementations, process 1130 may be performed by a server computing system. For example, the server computing system may be configured to generate a caption for an object detected in a digital image based on one or more object tags. Although the blocks of the process 1130 are presented in the order shown, it's possible that, in some implementations, the operations associated with these blocks may execute substantially in parallel or in a different order.

The process 1130 may start at block 1135 where object tags associated with a digital image may be identified. At block 1140, the bounding boxes associated with the digital image may be determined, as described with FIG. 4B. At block 1145, a location of each of the object tags on the digital image relative to an area of each of the bounding boxes may be determined. For example, screen coordinates associated with an object tag and screen coordinates associated with a bounding box may be used.

At block 1150, a weight value may be assigned to each of the object tags with the object tag located inside a bounding area of a bounding box assigned a higher weight value than an object tag outside of the bounding box. The assigning of the weight value to the object tags may be performed for each bounding box. At block 1155, a caption for an object included in a bounding box may be generated based on the weight values of the object tags included in the digital image.

Figure 11C:
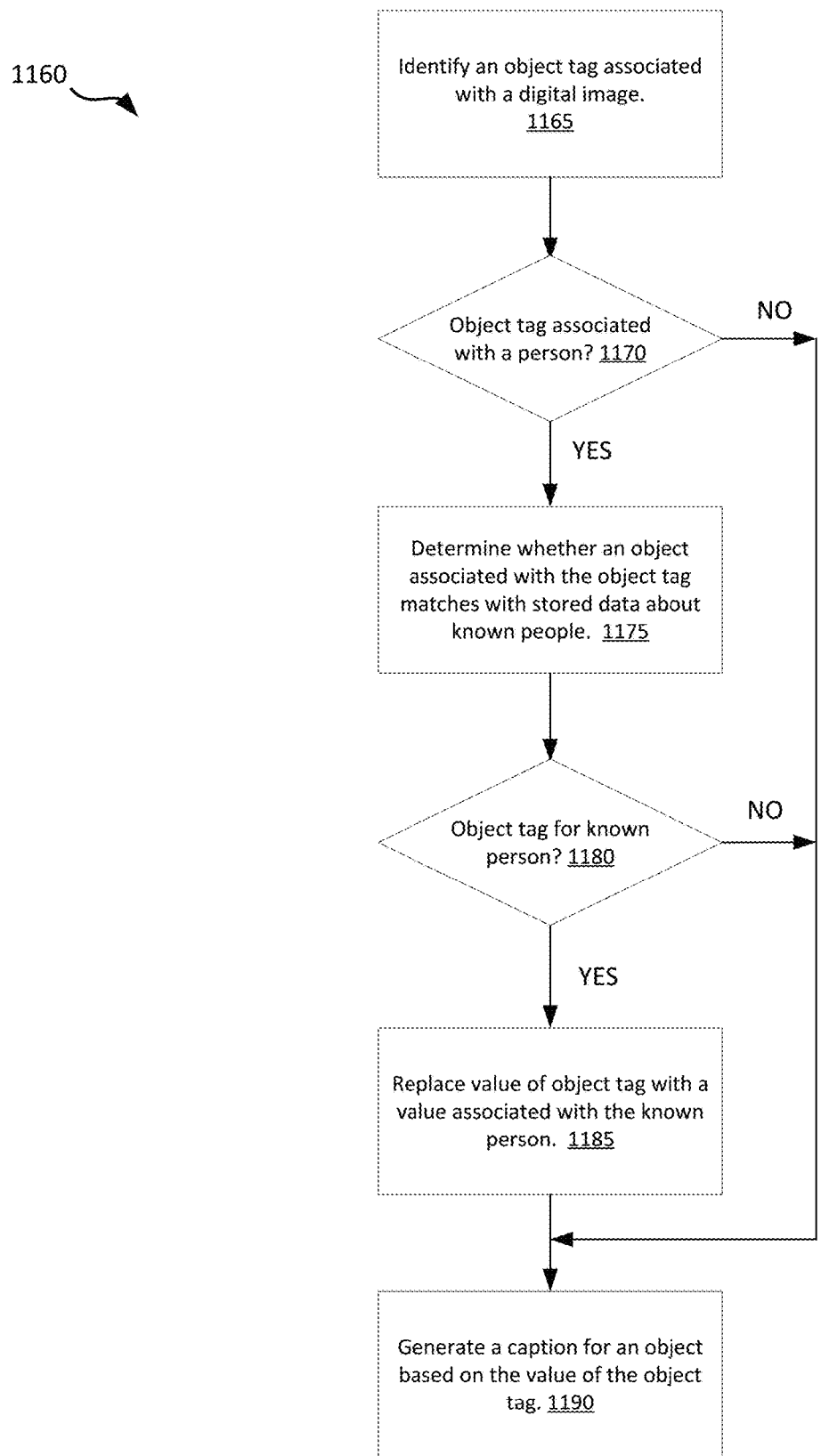
FIG. 11C shows an example process that may be performed to personalize an object tag, in accordance with some implementations.

FIG. 11C shows an example process that may be performed to personalize an object tag, in accordance with some implementations. Although the blocks of the process 1160 are presented in the order shown, it's possible that, in some implementations, the operations associated with these blocks may execute substantially in parallel or in a different order. In some implementations, process 1160 may be performed by a server computing system. For example, the server computing system may be configured to generate a caption for an object based on the object tags associated with a digital image that includes the object. The server computing system may activate a facial recognition application to recognize images that are associated with the same people.

At block 1165, an object tag associated with a digital image may be identified. The object tag may be associated with an object and may have a generic value. For example, when the object tag is associated with a young male object, the generic value may be "boy". The digital image may be associated with multiple object tags, and one of the object tags may be about an object that is a person. At block 1170, a test may be performed to determine whether an object tag is associated with an object that is a person. When the object is a person, the process may flow to block 1175 where operations may be performed to determine if the person associated with the object is someone that may be previously known. For example, facial recognition operations may be performed to match stored data with an image of the object.

At block 1180, a test may be performed to determine whether the image of the object matches with a known person. When there is a match, the process 1160 may flow from block 1180 to block 1185 where a value of the object tag may be replaced with a value associated with the known person such as, for example, the person's name. At block 1190, a caption for the object may be generated using the updated value of the object tag.

From block 1170, when the value of the object tag is not associated with a person, the process 1160 may flow to block 1190 and the existing value of the object tag may be used to generate a caption for the object. Similarly, from block 1180, when the image of the object does not match with an image of a known person, the process 1160 may flow from block 1180 to block 1190 where the existing value of the object tag may be used to generate the caption. Although the example above refers to a known person and using the name of the known person as a value for an object tag, the technique may be used to replace the generic value with a non-generic value such as, for example, replacing a generic value of "vehicle" with a non-generic value of "a Ford truck F150."

In some implementations, the techniques (e.g., methods, systems, etc.) described herein are implemented using a computing system. In one example, the computing system includes a server. In another example, the computing system includes a user device, such as a desktop computer, a laptop computer, a mobile phone, a tablet computer, a gaming console, a set-top box, a wearable computing device, a network-connected computing device, or the like. In some embodiments, the computing system is implemented as a single computing device, or as multiple communicatively coupled computing devices such as a combination of servers and/or computers coupled in a wired and/or wireless network such as the Internet, wide area network (WAN), local area network (LAN), virtual private network (VPN), intranet, etc. In some implementations, the computing system includes computing devices coupled over a local connection such as WiFi, Bluetooth, USB, etc.

Figure 12:
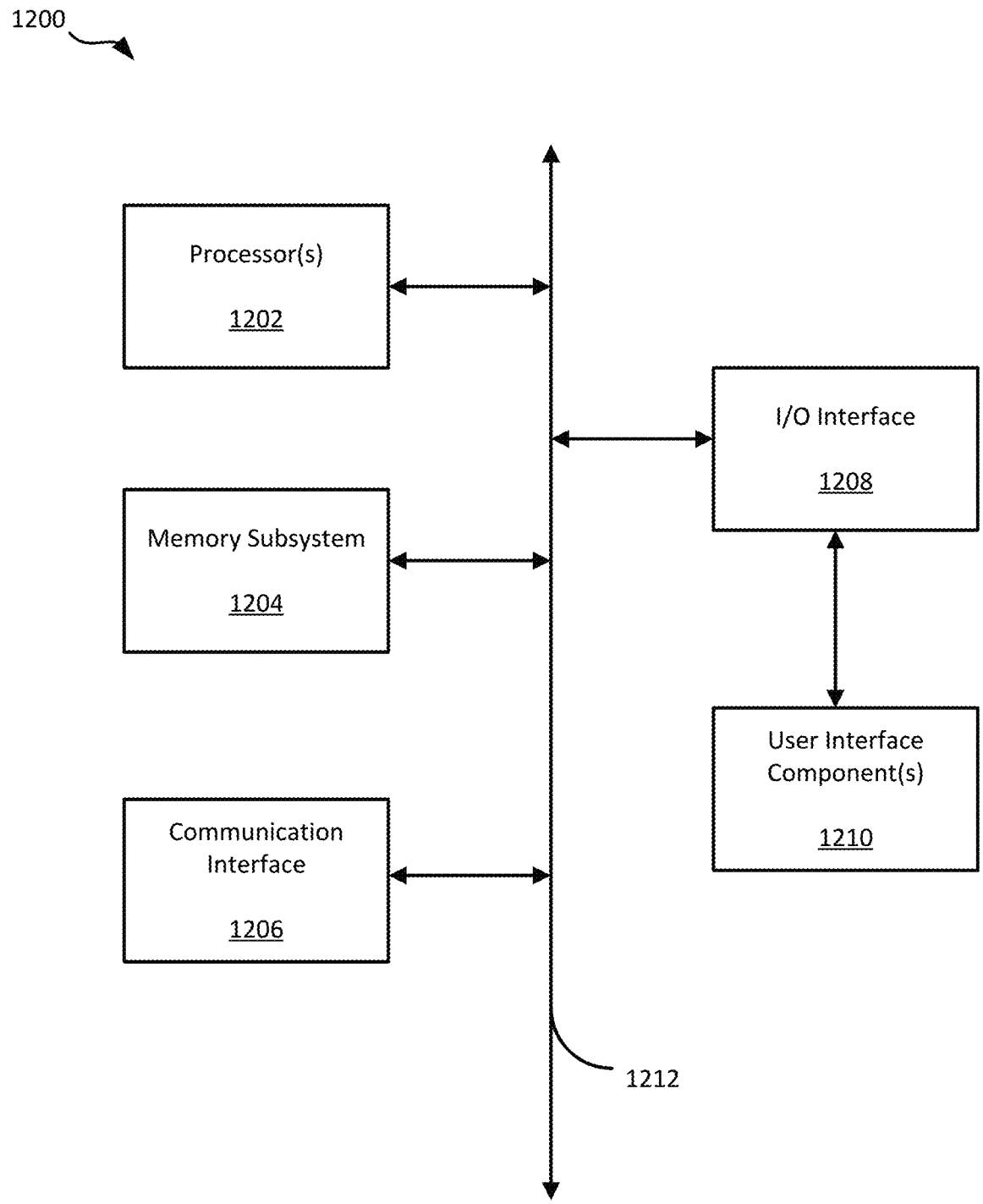
FIG. 12 shows a schematic diagram of components of a computing device that may be implemented in a computing system, in accordance with some implementations.

FIG. 12 shows a schematic diagram of components of a computing device that may be implemented in a computing system, in accordance with some implementations. As illustrated, computing device 1200 includes a bus 1212 that directly or indirectly couples one or more processors(s) 1202, a memory subsystem 1204, a communication interface 1206, an input/output (I/O) interface 1208, and/or one or more user interface components 1210. It should be noted that, in some embodiments, various other components may be included in a computing device that are not shown in FIG. 12, and/or one or more components shown in FIG. 12 can be omitted.

In some embodiments, computing device 1200 includes or is coupled to a memory subsystem 1204. Memory subsystem 1204 includes a computer-readable medium (e.g., non-transitory storage medium) or a combination of computer-readable media. Examples of computer-readable media that can be implemented in memory subsystem 1204 include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media can include non-volatile memory, volatile memory, or a combination thereof. Memory subsystem 1204 can also include one or more hardware devices such as a solid-state memory, one or more hard drives, one or more optical disk drives, or the like. In some embodiments, memory subsystem 1204 stores content files such as text-based files, audio files, image files, and/or video files, etc. The content files can include documents, pictures, photos, songs, podcasts, movies, etc. In some embodiments, memory subsystem 1204 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 1202, or processor(s) of another computing device communicatively coupled to computing device 1200) to perform various operations or functions such as those described with reference to FIGS. 2-7. In some embodiments, a computer program product is referred to as a non-transitory computer readable medium storing or comprising instructions to perform certain operations or functions. Examples of a computer program product include firmware, software driver, operating system, or software application. Examples of a software application can include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application can be implemented using one or more neural network or machine learning models. In such embodiments, one or more neural network or matching learning models can be trained using computing device 1200 (or a computing system that includes computing device 1200). Furthermore, computing device 1200 (or a computing system include computing device 100) can execute the one or more neural network or machine learning models as part of the computer program product to perform inference operations. It should be noted that the neural network or matching learning model(s) can be trained using a computing device or system that is the same as, overlaps with, or is separate from the computing device or system performing inference operations.

Communication interface 1206 is used by computing device 1200 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 1206 utilizes various drivers, wireless communication circuitry, network interface circuitry, or the like to enable communication via various communication networks.

I/O interface 1208 includes various drivers and/or hardware circuitry for receiving input from various input devices, providing output to various output devices, or exchanging input/output with various input/output devices. Devices coupled to I/O interface 1208 can include peripheral devices such as a printer, a docking station, a communication hub, a charging device, etc. Some devices coupled to I/O interface 1208 can be used as user interface component(s) 1210. For example, a user can operate input elements of user interface component(s) 1210 to invoke the functionality of computing device 1200 and/or of another device communicatively coupled to computing device 1200; a user can view, hear, and/or otherwise experience output from computing device 1200 via output elements of user interface component(s) 1210. Some user interface component(s) 1210 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various implementations are described herein which are intended to be illustrative. Alternative implementations may be apparent to those of ordinary skill in the art without departing from the scope of the disclosure. For example, one or more features from one implementation can be combined with another implementation to form an alternative implementation, and/or one or more features can be omitted from an implementation to form an alternative implementation without departing from the scope of the disclosure. Additionally, it should be noted that certain features described herein may be utilized without reference to other features described herein.

With reference to the various processes described above, it should be understood that an order in which operations are performed is not limited to the order described herein. Moreover, in some implementations, two or more operations may be performed concurrently and/or substantially in parallel. In some implementations, what is described as a single operation may be split into two or more operations (e.g., performed by the same device, performed by two or more different devices, etc.). In some implementations, what is described as multiple operations may be combined into a single operation (e.g., performed by the same device, etc.). Descriptions of various blocks, modules, or components as distinct should not be construed as requiring that the blocks, modules, or components be separate (e.g., physically separate) and/or perform separate operations. For example, two or more blocks, modules, and/or components may be merged. As another example, a single block, module, and/or components is split into multiple blocks, modules, and/or components.

The phrases "in some implementations," "in an implementation," "in one example," and "in an example" are used herein. It should be understood that these phrases may refer to the same implementations and/or examples or to different implementations and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, and C" should be understood to mean {A}, {B}, {C}, {A, B}, {A, C}, {B, C}, or {A, B, C}.

Although implementations have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain implementations could include, while other implementations do not include, certain features, elements, and/or steps. Thus, such conditional language is not generally intended to imply that features, elements, and/or steps are in any way required for one or more implementations or that one or more implementations necessarily include logic for deciding, with or without user input or prompting, whether these features, elements, and/or steps are included or are to be performed in any particular implementation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A non-transitory computer-readable medium comprising instructions that, when executed by at least one processor, cause the at least one processor to perform operations comprising:
   receiving an image having one or more objects including a first object;
   associating the first object with a bounding box;
   displaying the image on a touch sensitive screen;
   detecting a contact area with respect to the image via the touch sensitive screen;
   determining that the contact area corresponds to the bounding box associated with the first object based at least on a weight value assigned to a word representative of the first object representing a likelihood that the first object or the word representative of the first object is associated with the contact area, the weight value assigned to the word representative of the first object determined based on a distance between the first object and the detected contact area;
   generating a caption for the first object based at least on the weight value assigned to the word representative of the first object; and
   responsive to determining that the contact area corresponds to the bounding box associated with the first object, causing the generated caption of the first object to be audible, or a vibration pattern assigned to the first object to vibrate the touch sensitive screen, or a combination thereof.

2. The non-transitory computer-readable medium of claim 1, further comprising:
   detecting the one or more objects included in the image; and
   generating a corresponding bounding box for each of the one or more objects.

3. The non-transitory computer-readable medium of claim 2, wherein the one or more objects included in the image are detected using a machine learning (ML) model trained with bounding box annotated images as training data, and wherein the ML model is configured to generate a region features representation of the image and the corresponding bounding box for each of the one or more objects.

4. The non-transitory computer-readable medium of claim 3, further comprising:
   generating a corresponding caption for each of the one or more objects using object tags associated with the region features representation of the image.

5. The non-transitory computer-readable medium of claim 4, wherein each of the object tags is assigned a respective weight value, and wherein the corresponding caption for each of the one or more objects is generated based on at least the respective weight value of each of the object tags.

6. The non-transitory computer-readable medium of claim 5, wherein an object tag positioned closer to the contact area is assigned a higher weight value than an object tag positioned further from the contact area.

7. The non-transitory computer-readable medium of claim 5, wherein an object tag positioned within the bounding box associated with the first object is assigned a higher weight value than an object tag positioned outside of the bounding box associated with the first object.

8. The non-transitory computer-readable medium of claim 1, further comprising:
   generating a mask for each of the one or more objects, wherein the contact area determined to correspond to the bounding box associated with the first object includes a contact with the first object, and wherein the contact with the first object is determined based on whether a mask associated with the first object contains a pixel value at an area on the touch sensitive screen where the contact area is determined.

9. The non-transitory computer-readable medium of claim 1, further comprising:
assigning a unique vibration pattern to each of the one or more objects using haptic feedback.

10. A computer-implemented method comprising:
receiving an image to be displayed on a touch sensitive screen of a computing device, the image including one or more objects;
detecting the one or more objects and generating a bounding box for each of the one or more objects using a first machine learning (ML) model trained with bounding box annotated images as training data, the first ML model further generating a region features representation of the image;
generating a caption for each of the detected one or more objects using a second ML model trained with image-caption pairs as training data, the second ML model generating the caption based on at least captions associated with the region features representation of the image and a corresponding weight value of each of the captions, the corresponding weight value assigned to a caption based on a distance between the corresponding object and a contact area on the touch sensitive screen;
associating a respective unique haptic feedback vibration pattern with each of the detected one or more objects; and
generating a unique haptic feedback vibration pattern associated with a first object of the one or more objects based on a weight value of a first caption of the first object, the weight value of the first caption representing a likelihood of the first caption or the first object being associated with the contact area on the touch sensitive screen.

11. The computer-implemented method of claim 10, further comprising:
based on detecting a contact with the first object of the detected one or more objects at the contact area via the touch sensitive screen, causing a caption of the first object to be audible, or the touch sensitive screen to vibrate according to the unique haptic feedback vibration pattern associated with the first object, or a combination thereof.

12. The computer-implemented method of claim 11, wherein the contact with the first object is detected based on whether a mask associated with the first object contains a pixel value at an area on the touch sensitive screen where the contact is detected.

13. The computer-implemented method of claim 10, wherein the corresponding weight value of each of the object tags is determined based on a position of each of the object tags relative to a bounding box associated with the first object of the detected one or more objects when a caption for the first object is generated.

14. A system comprising:
memory configured to store computer-executable instructions; and
at least one computer processor configured to access the memory and execute the computer-executable instructions to:
receive an image having one or more objects including a first object;
display the image on a touch sensitive screen;
detect a contact with the image at a contact area via the touch sensitive screen;
identify a first bounding box that is associated with the first object from a plurality of bounding boxes containing the contact area is, wherein the first bounding box is identified based at least on a weight value assigned to a word referring to the first object, the weight value representing a probability of the first object or the word referring to the first object being associated with the contact area and determined based on a distance between the first object and the contact area;
generate a caption for the first object based at least on the weight value assigned to the word referring to the first object; and
responsive to identifying the first bounding box containing the contact area, cause the generated caption of the first object to be audible, or a vibration pattern assigned to the first object to vibrate the touch sensitive screen, or a combination thereof.

15. The system of claim 14, further comprising instructions to:
arrange the plurality of bounding boxes in an ascending order based on an area bounded by each of the plurality of bounding boxes; and
identify the first bounding box from the plurality of bounding boxes based on an area bounded by the first bounding box being a smallest area according to the ascending order.

16. The system of claim 15, further comprising instructions to:
detect the one or more objects included in the image using a first machine learning (ML) model trained with bounding box annotated images as training data; and
generate a corresponding bounding box for each of the detected one or more objects using the first ML model, wherein the first ML model generates a region features representation of the image.

17. The system of claim 16, further comprising instructions to:
generate a corresponding caption for each of the detected one or more objects using a second ML model trained with image-caption pairs as training data, the second ML model generating the corresponding caption for each of the detected one or more objects based on at least object tags associated with the region features representation of the image and a corresponding weight value assigned to each of the object tags.

18. The system of claim 14, wherein the contact is detected to be with the first object based on an object mask associated with the first object.

19. The system of claim 18, wherein the contact with the first object is detected based on whether the object mask associated with the first object contains a pixel value at the contact area on the touch sensitive screen where the contact is detected.

20. The non-transitory computer-readable medium of claim 1, wherein the word representative of the first object is generated by a language model based on the first object.

* * * * *